United States Patent
Hu

(10) Patent No.: US 12,335,115 B2
(45) Date of Patent: Jun. 17, 2025

(54) COMMUNICATION METHOD AND APPARATUS

(71) Applicant: HUAWEI TECHNOLOGIES CO., LTD., Shenzhen (CN)

(72) Inventor: Xiang Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 553 days.

(21) Appl. No.: 17/581,123

(22) Filed: Jan. 21, 2022

(65) Prior Publication Data

US 2022/0150139 A1 May 12, 2022

Related U.S. Application Data

(63) Continuation of application No. PCT/CN2020/089808, filed on May 12, 2020.

(30) Foreign Application Priority Data

Jul. 22, 2019 (CN) .......................... 201910661345.4

(51) Int. Cl.
 *H04L 43/022* (2022.01)
 *H04L 43/062* (2022.01)

(52) U.S. Cl.
 CPC .......... *H04L 43/022* (2013.01); *H04L 43/062* (2013.01)

(58) Field of Classification Search
 None
 See application file for complete search history.

(56) References Cited

U.S. PATENT DOCUMENTS 10,491,376 B1 * 11/2019 Suthar .................. H04L 63/102
10,623,417 B1 * 4/2020 Hohler .................... G06F 21/51
(Continued)

FOREIGN PATENT DOCUMENTS

| CN | 105307219 A | 2/2016 |
|----|-------------|--------|
| CN | 106612499 A | 5/2017 |

(Continued)

OTHER PUBLICATIONS

3GPP; TSG SA; Policy and Charging Control Framework for 5G system; Stage 2(Release 16), 3GPP TS 23.503 V16.1.0(Jun. 2019), Jun. 11, 2019, Total 10 Pages.

(Continued)

*Primary Examiner* — Jason E Mattis
*Assistant Examiner* — Bao G Nguyen
(74) *Attorney, Agent, or Firm* — HAUPTMAN HAM, LLP

(57) ABSTRACT

A communication method includes receiving a data packet and obtaining, according to a correspondence between a service package and a packet detection rule (PDR), a target service package corresponding to a target PDR matching the data packet. The method also includes performing data statistics collection based on the target service package, to obtain a data statistics collection result corresponding to the target service package. The method further includes sending the data statistics collection result corresponding to the target service package to a data analysis device. The method additionally includes receiving a data analysis result corresponding to the target service package. The method also includes performing traffic stimulation or traffic suppression on the target service package based on the data analysis result corresponding to the target service package.

17 Claims, 22 Drawing Sheets

(56) References Cited

U.S. PATENT DOCUMENTS

| | | | |
|---|---|---|---|
| 11,540,339 B2* | 12/2022 | Yang | H04W 76/12 |
| 2014/0187195 A1 | 7/2014 | Pallares Lopez et al. | |
| 2015/0170230 A1 | 6/2015 | Panchal et al. | |
| 2017/0105205 A1 | 4/2017 | Lu et al. | |
| 2018/0063334 A1 | 3/2018 | Nanjundan et al. | |
| 2018/0295529 A1* | 10/2018 | Jen | H04W 24/04 |
| 2019/0394833 A1* | 12/2019 | Talebi Fard | H04W 68/005 |
| 2020/0359440 A1* | 11/2020 | Qiao | H04W 76/12 |
| 2022/0070736 A1* | 3/2022 | Nazari | H04W 28/0284 |

FOREIGN PATENT DOCUMENTS

| | | |
|---|---|---|
| CN | 108270808 A | 7/2018 |
| CN | 108809667 A | 11/2018 |
| CN | 109428734 A | 3/2019 |
| CN | 109548063 A | 3/2019 |
| CN | 109831752 A | 5/2019 |
| CN | 109936460 A | 6/2019 |
| EP | 3007484 A1 | 4/2016 |
| EP | 3163940 A1 | 5/2017 |
| JP | 2015537408 A | 12/2015 |
| WO | 2015196433 A1 | 12/2015 |
| WO | 2016001727 A1 | 1/2016 |
| WO | 2019011794 A1 | 1/2019 |
| WO | 2019032968 A1 | 2/2019 |

OTHER PUBLICATIONS

3GPP; TSG SA; Telecommunication management; Charging management; 5G data connectivity domain charging; stage 2(Release 16), 3GPP TS 32.255 V16.1.0(Jun. 2019), Jun. 12, 2019, Total 20 Pages.

Huawei, "Policy and Charging Control", 3GPP TSG CT WG4 Meeting #89 C4-19023, Montreal. CA Feb. 25-Mar. 1, 2019, total 18 pages.

Japanese Office Action issued in corresponding Japanese Application No. 2022-504060, dated Mar. 7, 2023, pp. 1-12.

Extended European Search Report issued in corresponding European Application No. 20844902.5, dated Jul. 6, 2022, pp. 1-10.

Nokia et al., "PDR ID for Predefined PDRs", 3GPP TSG CT WG4 Meeting #85 Bis C4-185191, Sophia Antipolis, France; Jul. 9-13, 2018, total 3 pages.

3GPP TS 23.214 V16.0.0 (Jun. 2019) 3rd Generation Partnership Project; Technical Specification Group Services and System Aspects; Architecture enhancements for control and user plane separation of EPC nodes; Stage 2 (Release 16), Total 92 Pages.

3GPP TS 23.501 V15.3.0 (Sep. 2018); 3rd Generation Partnership Project; Technical Specification Group Services and System Aspects; System Architecture for the 5G System; Stage 2 (Release 15); total 226 pages.

3GPP TS 23.288 V16.0.0: "3rd Generation Partnership Project; Technical Specification Group Services and System Aspects; Architecture enhancements for 5G System (5GS) to support network data analytics services (Release 16)", Jun. 2019, total 52 pages.

3GPP TS 29.212 V16.0.0 (Jun. 2019) 3rd Generation Partnership Project; Technical Specification Group Core Network and Terminals; Policy and Charging Control (PCC); Reference points (Release 16), Total 285 Pages.

3GPP TS 29.244 V16.0.0 (Jun. 2019) 3rd Generation Partnership Project; Technical Specification Group Core Network and Terminals; Interface between the Control Plane and the User Plane Nodes; Stage 3 (Release 16), total 217 pages.

3GPP TS 29.512 V16.1.0 (Jun. 2019) 3rd Generation Partnership Project; Technical Specification Group Core Network and Terminals; 5G System; Session Management Policy Control Service; Stage 3 (Release 16), Total 157 Pages.

3GPP TS 29.514 V16.1.0 (Jun. 2019) 3rd Generation Partnership Project; Technical Specification Group Core Network and Terminals; 5G System; Policy Authorization Service; Stage 3 (Release 16), Total 84 Pages.

3GPP TS 29.571 V16.0.0 (Jun. 2019) 3rd Generation Partnership Project; Technical Specification Group Core Network and Terminals; 5G System; Common Data Types for Service Based Interfaces; Stage 3 (Release 16), Total 79 Pages.

International Search Report issued in corresponding International Application No. PCT/CN2020/089808, dated Aug. 12, 2020, pp. 1-9.

Chinese Office Action issued in corresponding Chinese Application No. 201910661345.4, dated Feb. 24, 2021, pp. 1-14.

Chinese Notice of Allowance issued in corresponding Chinese Application No. 201910661345.4, dated Aug. 25, 2021, pp. 1-4.

Chinese Office Action issued in corresponding Chinese Application No. 202111182067.8, dated Apr. 21, 2022, pp. 1-6.

* cited by examiner

COMMUNICATION METHOD AND APPARATUS

CROSS-REFERENCE TO RELATED APPLICATIONS

This application is a continuation of International Application No. PCT/CN2020/089808, filed on May 12, 2020, which claims priority to Chinese Patent Application No. 201910661345.4, filed on Jul. 22, 2019. The disclosures of the aforementioned applications are hereby incorporated by reference in their entireties.

TECHNICAL FIELD

This application relates to the field of communication technologies, and in particular, to a communication method and apparatus.

BACKGROUND

FIG. 1 is a schematic diagram of a 4G (fourth generation mobile communication system) network architecture. As shown in FIG. 1, a core network of a 4G network includes a policy and charging rules function (PCRF) entity and a packet data network gateway (PGW). The PCRF entity is configured to deliver a policy and charging control (PCC) rule to a subscriber based on subscribed package information, traffic usage information, and the like of the subscriber. The PCC rule is a group of parameters used to implement traffic data flow detection and provide corresponding policy control and/or charging control. Usually, the PGW may be configured to detect a traffic flow and execute the PCC rule delivered by the PCRF entity. The core network of the 4G network may further include a traffic detection function (TDF) entity. The TDF entity is separately connected to the PCRF entity and the PGW. The TDF entity is mainly configured to: perform application detection, and report detected application information to the PCRF entity.

In a 4G system architecture in which a control plane and a user plane of a core network are separated, a serving gateway (SGW), a PGW, and a TDF entity are separately divided into a serving gateway control plane function (SGW-C) entity, a PDN gateway control plane function (PGW-C) entity, a traffic detection function control plane (TDF-C) entity, a serving gateway user plane function (SGW-U) entity, a PDN gateway user plane function (PGW-U) entity, and a traffic detection function user plane (TDF-U) entity. FIG. 2 is a schematic diagram in which a control plane and a user plane of a core network are separated in a 4G network. A control plane function entity is configured to manage a user plane function entity, or implement another non-session-level management function. The user plane function entity is configured to provide a service for the control plane function entity. For example, the user plane function entity may establish a session bearer according to a control instruction delivered by the control plane, to complete user data forwarding. In the 4G system architecture in which the control plane and the user plane of the core network are separated, the PGW-U entity may execute the PCC rule delivered by the PCRF entity.

In a 5G (fifth generation mobile communication system) network architecture, a network architecture of a next-generation core network device is further adjusted. FIG. 3 is a system architecture of a 5G network with service-based interfaces. A policy control function (PCF) entity is configured to deliver a PCC rule to a subscriber based on subscribed package information, traffic usage information, and the like of the subscriber. A session management function (SMF) entity is configured to manage a user plane function (UPF) entity. For example, the SMF entity needs to manage selection of a UPF entity, and the SMF entity also has non-session-level management functions such as policy delivery, event reporting, UPF entity heartbeat detection, and UPF entity load reporting. The UPF entity is configured to provide a service for the SMF entity. For example, the UPF entity may establish a session bearer according to a control instruction delivered by the SMF entity, to complete user data forwarding. The UPF entity may further execute the PCC rule delivered by the PCF entity.

The PCF entity/PCRF entity may deliver a PCC rule to a network element, for example, a PGW, a PGW-C entity, an SMF entity, or the like based on a service package of the subscriber, to activate the PCC rule. The PGW, a PGW-U entity, or the UPF entity performs PCC rule matching on a traffic data flow of the subscriber based on the PCC rule activated by the subscriber, and executes a charging and control policy carried in a successfully matched PCC rule. However, it is found in practice that a device (for example, the PGW, the PGW-U entity, or the UPF entity) other than the PCF entity/PCRF entity cannot determine a service package to which a received data packet belongs. Therefore, a related operation cannot be further performed based on the service package. Therefore, how to enable the device to accurately determine the service package to which the received data packet belongs is a problem that needs to be urgently resolved at present.

SUMMARY

Embodiments of this application provide a communication method and apparatus, to help a device accurately determine a service package to which a received data packet belongs.

According to a first aspect, an embodiment of this application provides a communication method. The method includes: A first device obtains a service package subscribed to by a subscriber. The first device determines a policy and charging control PCC rule corresponding to the service package. The first device sends, to a second device, an identifier of the service package and the PCC rule corresponding to the service package. Based on the method described in the first aspect, a device for the first device can accurately determine the service package to which a received data packet belongs.

In an optional implementation, the first device receives, from a data analysis device, a data analysis result corresponding to a target service package. The first device performs traffic stimulation or traffic suppression on the target service package based on the data analysis result corresponding to the target service package. Based on this optional implementation, traffic of the target service package can be flexibly controlled based on the data analysis result corresponding to the target service package.

In an optional implementation, the first device is a policy control function PCF entity, and the second device is a session management function SMF entity. Alternatively, the first device is a policy and charging rules function PCRF entity, and the second device is a packet data network gateway control plane PGW-C entity. Alternatively, the first device is a PCRF entity, and the second device is a traffic detection function control plane TDF-C entity. Alternatively, the first device is a PCRF entity, and the second device is a packet data network gateway PGW. Alternatively, the first device is a PCRF entity, and the second device is a traffic detection function TDF entity.

In an optional implementation, the first device is the PCF entity, and the second device is the SMF entity. The identifier of the service package is carried in an information element of the corresponding PCC rule and sent to the second device. Alternatively, the first device only sends an identifier of one service package, and the identifier of the service package is carried in an information element of a session rule and sent to the second device. Based on this optional implementation, the SMF entity can accurately determine a correspondence between the service package and the PCC rule.

In an optional implementation, the first device is the PCRF entity, and the second device is the PGW-C entity. Alternatively, the first device is the PCRF entity, and the second device is the TDF-C entity. Alternatively, the first device is the PCRF entity, and the second device is the PGW. Alternatively, the first device is the PCRF entity, and the second device is the TDF entity. The identifier of the service package is carried in an information element of a charging-rule-install charging-rule-install message and sent to the second device. Alternatively, the first device only sends an identifier of one service package, and the identifier of the service package is carried in an information element of a credit control answer CCA message or an information element of a re-authentication request RAR message and sent to the second device. Based on this optional implementation, the second device can accurately determine a correspondence between the service package and the PCC rule.

According to a second aspect, an embodiment of this application provides a communication method. The method includes: A second device receives, from a first device, an identifier of a service package and a policy and charging control PCC rule corresponding to the service package. The second device converts the PCC rule corresponding to the service package into a packet detection rule PDR. The second device sends, to a third device, the identifier of the service package and the PDR corresponding to the service package. Based on the method described in the second aspect, a device for the first device can accurately determine the service package to which a received data packet belongs.

In an optional implementation, the second device receives, from a data analysis device, a data analysis result corresponding to a target service package. The second device performs traffic stimulation or traffic suppression on the target service package based on the data analysis result corresponding to the target service package. Based on this optional implementation, traffic of the target service package can be flexibly controlled based on the data analysis result corresponding to the target service package.

In an optional implementation, the first device is a policy control function PCF entity, the second device is a session management function SMF entity, and the third device is a user plane function UPF entity. Alternatively, the first device is a policy and charging rules function PCRF entity, the second device is a packet data network gateway control plane PGW-C entity, and the third device is a packet data network gateway user plane PGW-U entity. Alternatively, the first device is a PCRF entity, the second device is a traffic detection function control plane TDF-C entity, and the third device is a traffic detection function user plane TDF-U entity.

In an optional implementation, the first device is the PCF entity, the second device is the SMF entity, and the third device is the UPF entity. The identifier of the service package is carried in an information element of the corresponding PCC rule and sent to the second device. Alternatively, the first device only sends an identifier of one service package, and the identifier of the service package is carried in an information element of a session rule and sent to the second device. Based on this optional implementation, the SMF entity can accurately determine a correspondence between the service package and the PCC rule.

In an optional implementation, the first device is the PCRF entity, the second device is the PGW-C entity, and the third device is the PGW-U entity. Alternatively, the first device is the PCRF entity, the second device is the TDF-C entity, and the third device is the TDF-U entity. The identifier of the service package is carried in an information element of a charging-rule-install charging-rule-install message and sent to the second device. Alternatively, when the first device only sends an identifier of one service package, the identifier of the service package is carried in an information element of a credit control answer CCA message or an information element of a re-authentication request RAR message and sent to the second device. Based on this optional implementation, the second device can accurately determine a correspondence between the service package and the PCC rule.

In an optional implementation, the identifier of the service package is carried in an information element of the PDR corresponding to the service package and sent to the third device. Alternatively, when the second device only sends the identifier of one service package, the identifier of the service package is carried in an information element of a session establishment request and sent to the third device. Based on this optional implementation, the third device can accurately determine a correspondence between the service package and the PDR.

According to a third aspect, an embodiment of this application provides a communication method. The method includes: A third device receives, from a second device, an identifier of a service package and a packet detection rule PDR corresponding to the service package. The third device records a correspondence between the service package and the PDR. The third device receives a data packet. The third device determines a target packet detection rule PDR matching the data packet. The third device obtains, according to the recorded correspondence between the service package and the PDR, a target service package corresponding to the target PDR. Based on the method described in the third aspect, the third device can accurately determine the service package to which the received data packet belongs.

In an optional implementation, the third device performs data statistics collection on the target service package based on the data packet, to obtain a data statistics collection result corresponding to the target service package. Based on the optional implementation, the third device can perform data statistics collection on the target service package.

In an optional implementation, the third device sends, to a data analysis device, the data statistics collection result corresponding to the target service package.

In an optional implementation, the third device receives, from the data analysis device, a data analysis result corresponding to the target service package. The third device performs traffic stimulation or traffic suppression on the target service package based on the data analysis result corresponding to the target service package. Based on this optional implementation, traffic of the target service package can be flexibly controlled based on the data analysis result corresponding to the target service package.

In an optional implementation, the second device is a session management function SMF entity, and the third device is a user plane function UPF entity. Alternatively, the second device is a packet data network gateway control plane PGW-C entity, and the third device is a packet data network gateway user plane PGW-U entity. Alternatively, the second device is a traffic detection function control plane TDF-C entity, and the third device is a traffic detection function user plane TDF-U entity.

In an optional implementation, the identifier of the service package is carried in an information element of the PDR corresponding to the service package and sent to the third device. Alternatively, when the second device only sends an identifier of one service package, the identifier of the service package is carried in an information element of a session establishment request and sent to the third device. Based on this optional implementation, the third device can accurately determine the correspondence between the service package and the PDR.

According to a fourth aspect, an embodiment of this application provides a communication method. The method includes: A second device receives, from a first device, an identifier of a service package and a PCC rule corresponding to the service package. The second device records a correspondence between the service package and the PCC rule. The second device receives a data packet. The second device determines a target PCC rule matching the data packet. The second device obtains, according to the recorded correspondence between the PCC rule and the service package, a target service package corresponding to the target PCC rule. Based on the method described in the fourth aspect, the second device can accurately determine the service package to which the received data packet belongs.

In an optional implementation, the second device performs data statistics collection on the target service package based on the data packet, to obtain a data statistics collection result. Based on the optional implementation, the third device can perform data statistics collection on the target service package.

In an optional implementation, the second device sends, to a data analysis device, the data statistics collection result corresponding to the target service package.

In an optional implementation, the second device receives, from the data analysis device, a data analysis result of the target service package. The second device performs traffic stimulation or traffic suppression on the target service package based on the data analysis result corresponding to the target service package. Based on this optional implementation, traffic of the target service package can be flexibly controlled based on the data analysis result corresponding to the target service package.

In an optional implementation, the first device is a policy and charging rules function PCRF entity, and the second device is a packet data network gateway PGW. Alternatively, the first device is a PCRF, and the second device is a service detection function TDF entity. Alternatively, the first device is a PGW, and the second device is a TDF entity.

In an optional implementation, the first device is the PCRF entity, and the second device is the PGW. Alternatively, the first device is the PCRF, and the second device is the TDF entity. The identifier of the service package is carried in an information element of a charging-rule-install message and sent to the second device. Alternatively, the first device only sends an identifier of one service package, and the identifier of the service package is carried in an information element of a credit control answer CCA message or an information element of a re-authentication request RAR message and sent to the second device. Based on this optional implementation, the second device can accurately determine the correspondence between the service package and the PCC rule.

According to a fifth aspect, an embodiment of this application provides a communication method. The method includes: A data analysis device receives a data statistics collection result corresponding to a target service package. The data analysis device analyzes the data statistics collection result to obtain a data analysis result corresponding to the target service package. The data analysis device sends the data analysis result corresponding to the target service package. Based on this optional implementation, data analysis can be performed on the data statistics collection result corresponding to the target service package.

According to a sixth aspect, a communication apparatus is provided. The communication apparatus may be a first device or an apparatus used for the first device. For example, the apparatus used for the first device may be a chip in the first device. The communication apparatus may perform the method described in any one of the first aspect and the optional implementations of the first aspect. A function of the communication apparatus may be implemented by hardware, or may be implemented by hardware executing corresponding software. The hardware or the software includes one or more units corresponding to the foregoing function. The unit may be software and/or hardware. For an operation performed by the communication apparatus and beneficial effects, refer to the method and the beneficial effects described in any one of the first aspect and the optional implementations of the first aspect. Repeated details are not described again.

According to a seventh aspect, a communication apparatus is provided. The communication apparatus may be a second device or an apparatus used for the second device. For example, the apparatus used for the second device may be a chip in the second device. The communication apparatus may perform the method described in any one of the second aspect, the fourth aspect, the optional implementations of the first aspect, and the optional implementations of the fourth aspect. A function of the communication apparatus may be implemented by hardware, or may be implemented by hardware executing corresponding software. The hardware or the software includes one or more units corresponding to the foregoing function. The unit may be software and/or hardware. For an operation performed by the communication apparatus and beneficial effects, refer to the method and the beneficial effects described in any one of the second aspect, the fourth aspect, the optional implementations of the first aspect, and the optional implementations of the fourth aspect. Repeated details are not described again.

According to an eighth aspect, a communication apparatus is provided. The communication apparatus may be a third device or an apparatus used for the third device. For example, the apparatus used for the third device may be a chip in the third device. The communication apparatus may perform the method described in any one of the third aspect and the optional implementations of the third aspect. A function of the communication apparatus may be implemented by hardware, or may be implemented by hardware executing corresponding software. The hardware or the software includes one or more units corresponding to the foregoing function. The unit may be software and/or hardware. For an operation performed by the communication apparatus and beneficial effects, refer to the method and the beneficial effects described in any one of the third aspect and the optional implementations of the third aspect. Repeated details are not described again.

According to a ninth aspect, a communication apparatus is provided. The communication apparatus may be a data analysis device or an apparatus used for the data analysis device. For example, the apparatus used for the data analysis device may be a chip in the data analysis device. The communication apparatus may perform the method described in any one of the fifth aspect and the optional implementations of the fifth aspect. A function of the communication apparatus may be implemented by hardware, or may be implemented by hardware executing corresponding software. The hardware or the software includes one or more units corresponding to the foregoing function. The unit may be software and/or hardware. For an operation performed by the communication apparatus and beneficial effects, refer to the method and the beneficial effects described in any one of the fifth aspect and the optional implementations of the fifth aspect. Repeated details are not described again.

According to a tenth aspect, a communication apparatus is provided. The communication apparatus may be a first device or an apparatus used for the first device. For example, the apparatus used for the first device may be a chip in the first device. The communication apparatus includes a processor and a transceiver. The processor is connected to the transceiver. Optionally, the communication apparatus further includes a memory. The processor is connected to the memory.

In an optional design, when the communication apparatus is the first device, the transceiver may include an antenna and a radio frequency circuit connected to the antenna. The transceiver is configured to implement communication between the communication apparatus and another network element.

In another optional design, when the communication apparatus is the apparatus used for the first device, the transceiver may be an interface circuit. The interface circuit is used by the processor to obtain or output information or data. For example, the interface circuit is used by the processor to read data from the memory or write data into the memory. For another example, the interface circuit is used by the processor to receive information or data from outside the device, or send information or data to outside the device.

The processor is configured to perform the method described in any one of the first aspect and the optional implementations of the first aspect.

The memory is configured to store a program, and the processor invokes the program stored in the memory to perform the method according to any one of the first aspect and the optional implementations of the first aspect. For an operation performed by the processor and beneficial effects, refer to the method and the beneficial effects described in any one of the first aspect and the optional implementations of the first aspect. Repeated details are not described again.

According to an eleventh aspect, a communication apparatus is provided. The communication apparatus may be a second device or an apparatus used for the second device. For example, the apparatus used for the second device may be a chip in the second device. The communication apparatus includes a processor and a transceiver. The processor is connected to the transceiver. Optionally, the communication apparatus further includes a memory. The processor is connected to the memory.

In an optional design, when the communication apparatus is the second device, the transceiver may include an antenna and a radio frequency circuit connected to the antenna. The transceiver is configured to implement communication between the communication apparatus and another network element.

In another optional design, when the communication apparatus is the apparatus used for the second device, the transceiver may be an interface circuit. The interface circuit is used by the processor to obtain or output information or data. For example, the interface circuit is used by the processor to read data from the memory or write data into the memory. For another example, the interface circuit is used by the processor to receive information or data from outside the device, or send information or data to outside the device.

The processor is configured to perform the method according to any one of the second aspect, the fourth aspect, the optional implementations of the second aspect, and the optional implementations of the fourth aspect.

The memory is configured to store a program, and the processor invokes the program stored in the memory to perform the method according to any one of the second aspect, the fourth aspect, the optional implementations of the second aspect, and the optional implementations of the fourth aspect. For an operation performed by the processor and beneficial effects, refer to the method and the beneficial effects described in any one of the second aspect, the fourth aspect, the optional implementations of the second aspect, and the optional implementations of the fourth aspect. Repeated details are not described again.

According to a twelfth aspect, a communication apparatus is provided. The communication apparatus may be a third device or an apparatus used for the third device. For example, the apparatus used for the third device may be a chip in the third device. The communication apparatus includes a processor and a transceiver. The processor is connected to the transceiver. Optionally, the communication apparatus further includes a memory. The processor is connected to the memory.

In an optional design, when the communication apparatus is the third device, the transceiver may include an antenna and a radio frequency circuit connected to the antenna. The transceiver is configured to implement communication between the communication apparatus and another network element.

In another optional design, when the communication apparatus is the apparatus used for the third device, the transceiver may be an interface circuit. The interface circuit is used by the processor to obtain or output information or data. For example, the interface circuit is used by the processor to read data from the memory or write data into the memory. For another example, the interface circuit is used by the processor to receive information or data from outside the device, or send information or data to outside the device.

The processor is configured to perform the method according to any one of the third aspect and the optional implementations of the third aspect.

The memory is configured to store a program, and the processor invokes the program stored in the memory to perform the method according to any one of the third aspect and the optional implementations of the third aspect. For an operation performed by the processor and beneficial effects, refer to the method and the beneficial effects described in any one of the third aspect and the optional implementations of the third aspect. Repeated details are not described again.

According to a thirteenth aspect, a communication apparatus is provided. The communication apparatus may be a data analysis device or an apparatus used for the data analysis device. For example, the apparatus used for the data analysis device may be a chip in the data analysis device. The communication apparatus includes a processor and a transceiver. The processor is connected to the transceiver. Optionally, the communication apparatus further includes a memory. The processor is connected to the memory.

In an optional design, when the communication apparatus is the data analysis device, the transceiver may include an antenna and a radio frequency circuit connected to the antenna. The transceiver is configured to implement communication between the communication apparatus and another network element.

In another optional design, when the communication apparatus is the apparatus used for the data analysis device, the transceiver may be an interface circuit. The interface circuit is used by the processor to obtain or output information or data. For example, the interface circuit is used by the processor to read data from the memory or write data into the memory. For another example, the interface circuit is used by the processor to receive information or data from outside the device, or send information or data to outside the device.

The processor is configured to perform the method according to any one of the fifth aspect and the optional implementations of the fifth aspect.

The memory is configured to store a program, and the processor invokes the program stored in the memory to perform the method according to any one of the fifth aspect and the optional implementations of the fifth aspect. For an operation performed by the processor and beneficial effects, refer to the method and the beneficial effects described in any one of the fifth aspect and the optional implementations of the fifth aspect. Repeated details are not described again.

According to a fourteenth aspect, a computer program product is provided. When the computer program product runs on a computer, the computer is enabled to perform the method according to any one of the first aspect, the second aspect, the third aspect, the fourth aspect, the fifth aspect, the optional implementations of the first aspect, the optional implementations of the second aspect, the optional implementations of the third aspect, the optional implementations of the fourth aspect, and the optional implementations of the fifth aspect.

According to a fifteenth aspect, a computer-readable storage medium is provided. The computer-readable storage medium stores instructions. When the instructions are run on a computer, the computer is enabled to perform the method according to any one of the first aspect, the second aspect, the third aspect, the fourth aspect, the fifth aspect, the optional implementations of the first aspect, the optional implementations of the second aspect, the optional implementations of the third aspect, the optional implementations of the fourth aspect, and the optional implementations of the fifth aspect.

DESCRIPTION OF EMBODIMENTS

The following further describes specific embodiments of this application in detail with reference to the accompanying drawings.

Embodiments of this application provide a communication method and apparatus, to enable a core network device to accurately determine a service package to which a received data packet belongs.

To better understand the embodiments of this application, the following describes a system architecture to which the embodiments of this application are applicable.

Figure 4:
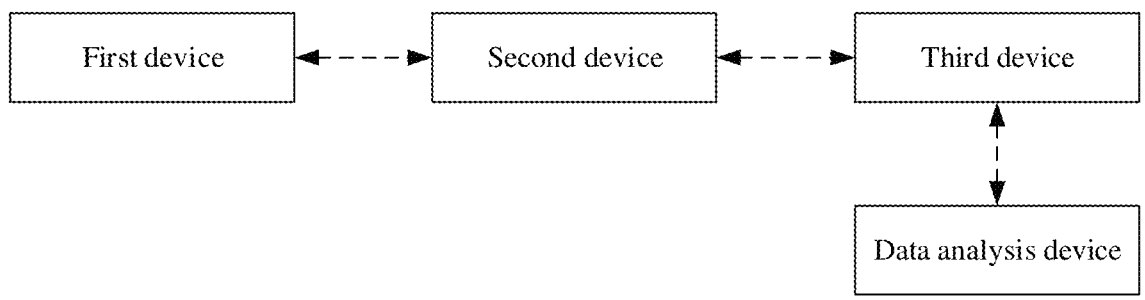
FIG. 4 is a schematic diagram of a communication system according to an embodiment of this application.

FIG. 4 is a schematic diagram of a communication system according to an embodiment of this application. As shown in FIG. 4, the communication system includes a first device, a second device, a third device, and a data analysis device. The first device is wirelessly connected to the second device. The second device is wirelessly connected to the third device. The data analysis device is wirelessly connected to the third device. Optionally, the data analysis device may be further wirelessly connected to the first device and/or the second device. FIG. 4 is merely the schematic diagram of the communication system according to the embodiment of this application. An example in which the communication system includes the first device, the second device, the third device, and the data analysis device is used in FIG. 4. Certainly, the communication system may further include another device. This is not limited in this embodiment of this application.

The data analysis device may be a network data analytics function (NWDAF) entity, a report system configured to generate a report, or another device that can perform data analysis.

The first device is configured to generate and deliver a policy and charging control (PCC) rule. The second device is a control plane device. The third device is a user plane device configured to execute the PCC rule delivered by the first device.

The communication system shown in FIG. 4 is applied to a scenario in which a control plane and a user plane are separated. For example, the communication system shown in FIG. 4 may be applied to any one of the following application scenario 1 to application scenario 3.

Application scenario 1: The first device is a policy control function (PCF) entity, the second device is a session management function (SMF) entity, and the third device is a user plane function (UPF) entity. The PCF entity is configured to deliver the policy and charging control (policy and charging control, PCC) rule to a subscriber based on subscribed package information, used service information, and the like of the subscriber. The UPF entity is configured to execute the PCC rule delivered by the PCF entity.

Figure 3:
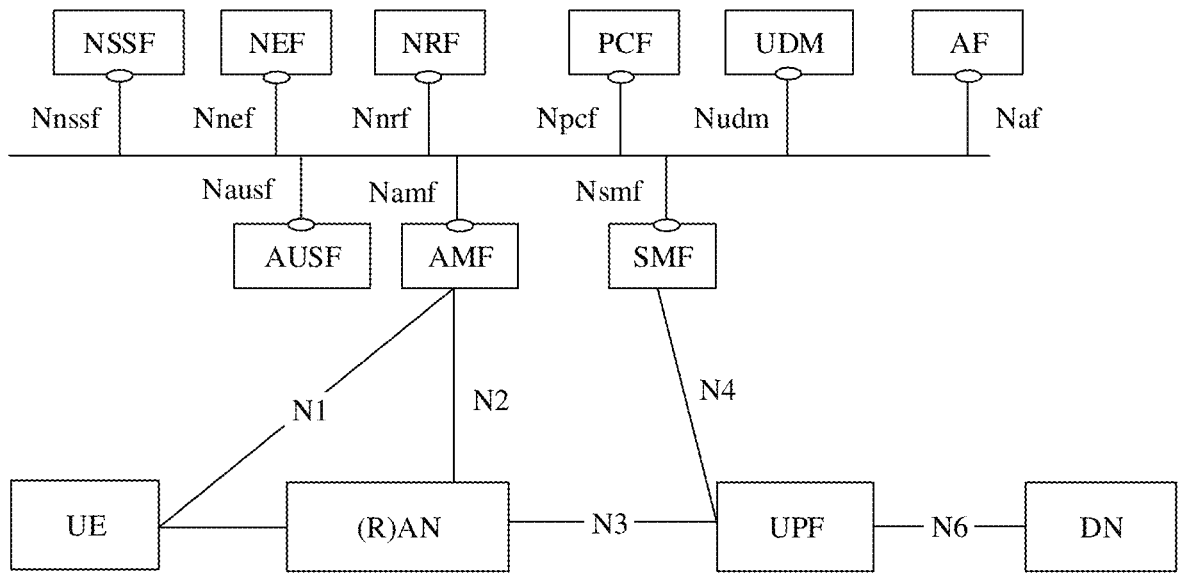
FIG. 3 is a schematic diagram of an existing system architecture of a 5G network with a service-based interface.

Optionally, in the application scenario 1, the communication system may further include a network slice selection function (NSSF) entity, a network exposure function (NEF) entity, a network repository function (NRF) entity, a unified data management (UDM) entity, an application function (AF) entity, an authentication server function (AUSF) entity, an access and mobility management function (AMF) entity, user equipment (UE), a radio access network (RAN), a data network (DN), and the like in FIG. 3.

Application scenario 2: The first device is a policy and charging rules function (PCRF) entity, the second device is a PDN gateway control plane function (PGW-C) entity, and the third device is a PDN gateway user plane function (PGW-U) entity. The PCRF entity is configured to deliver the policy and charging control (PCC) rule to a subscriber based on subscribed package information, used service information, and the like of the subscriber. The PGW-U entity is configured to execute the PCC rule delivered by the PCRF entity.

Figure 2:
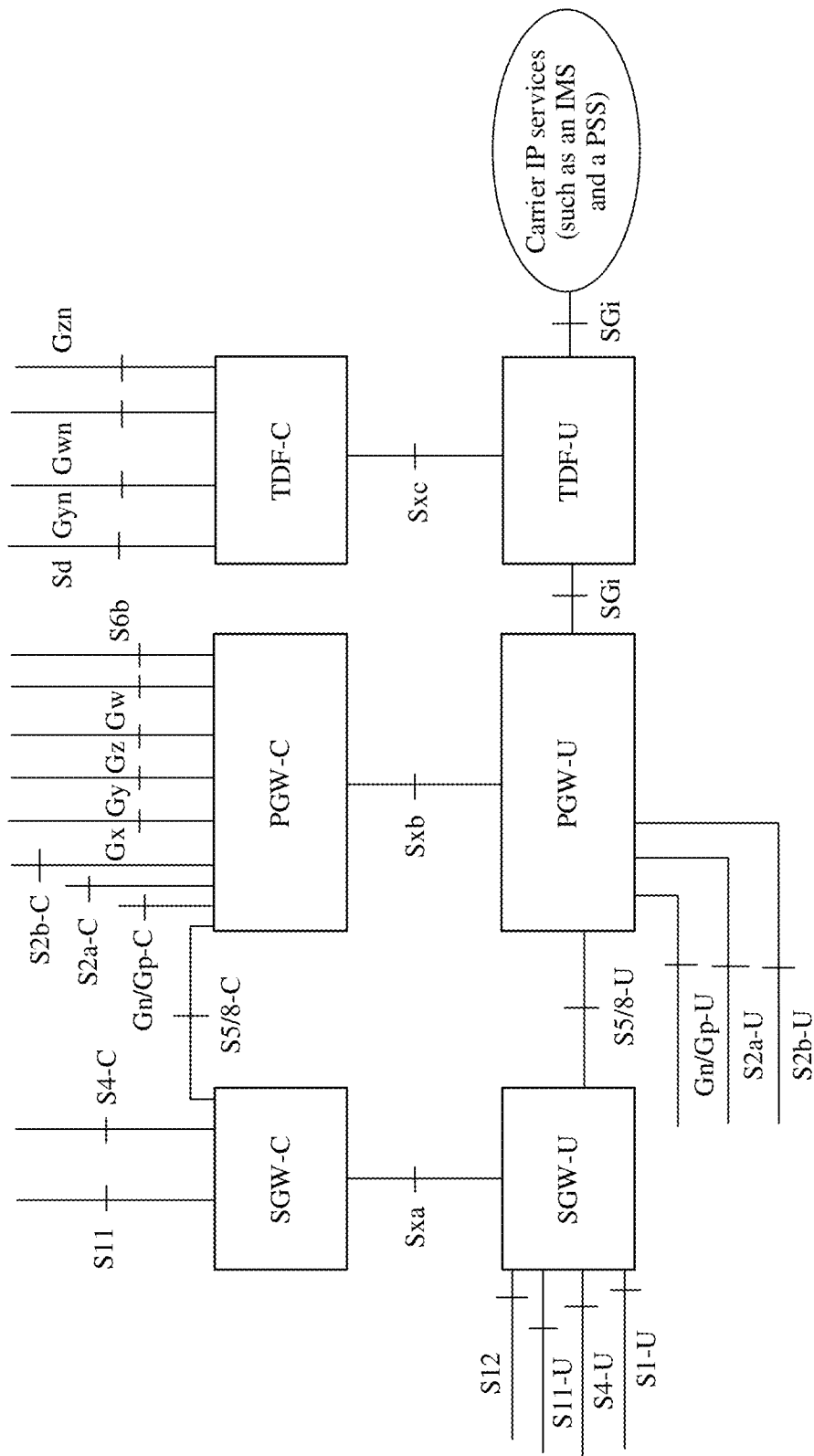
FIG. 2 is a schematic diagram of an existing system architecture in which a core network control plane and a user plane are separated.

Optionally, in the application scenario 2, the communication system may further include a serving gateway control plane function (SGW-C) entity, a serving gateway user plane function (SGW-U) entity, a traffic detection function control plane (TDF-C) entity, a traffic detection function user plane (TDF-U) entity, and the like in FIG. 2.

Application scenario 3: The first device is a PCRF entity, the second device is a TDF-C entity, and the third device is a TDF-U entity. The PCRF entity is configured to deliver the policy and charging control (PCC) rule to a subscriber based on subscribed package information, used service information, and the like of the subscriber. The TDF-U entity is configured to execute the PCC rule delivered by the PCRF entity. Optionally, in the application scenario 3, the communication system may further include an SGW-C entity, an SGW-U entity, a PGW-C entity, a PGW-U entity, and the like in FIG. 2.

Figure 5:
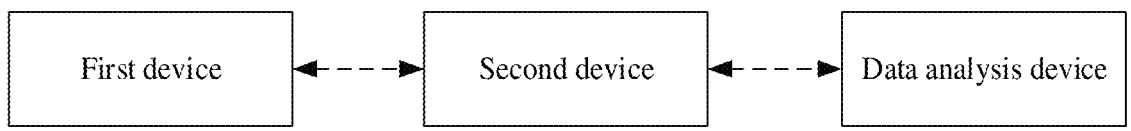
FIG. 5 is a schematic diagram of another communication system according to an embodiment of this application.

FIG. 5 is a schematic diagram of another communication system according to an embodiment of this application. As shown in FIG. 5, the communication system includes a first device, a second device, and a data analysis device. The first device is wirelessly connected to the second device. The data analysis device is wirelessly connected to the second device. Optionally, the data analysis device may be further wirelessly connected to the first device. FIG. 5 is merely the schematic diagram of the communication system according to the embodiment of this application. An example in which the communication system includes the first device, the second device, and the data analysis device is used in FIG. 5. Certainly, the communication system may further include another device. This is not limited in this embodiment of this application.

The data analysis device may be a network data analytics function (NWDAF) entity, a report system configured to generate a report, or another device that can perform data analysis.

The communication system shown in FIG. 5 is applied to a scenario in which a control plane and a user plane are not separated. For example, the communication system shown in FIG. 5 may be applied to any one of the following application scenario 4 and application scenario 5.

Figure 1:
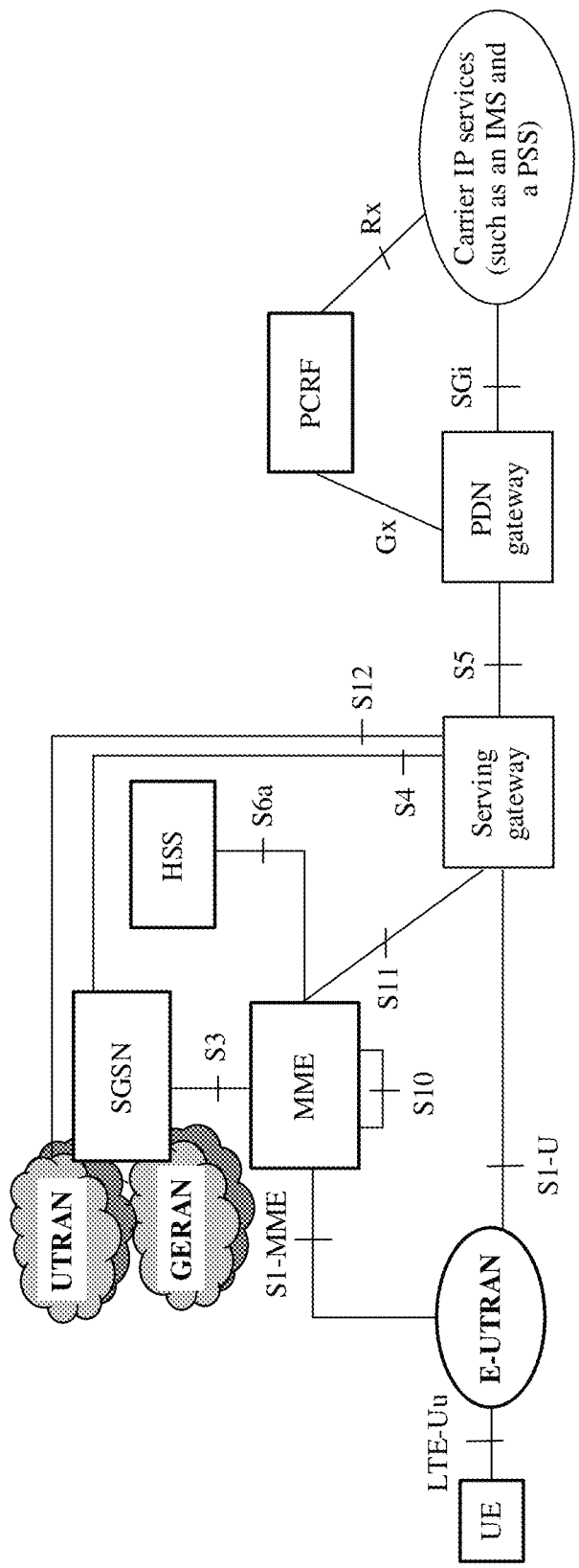
FIG. 1 is a schematic diagram of an existing system architecture of a 4G network.

Application scenario 4: The first device is a PCRF entity, and the second device is a PGW. Optionally, in the application scenario 4, the communication system shown in FIG. 5 may further include a device other than the PCRF entity and the PGW in FIG. 1.

Application scenario 5: The first device is a PCRF entity, and the second device is a TDF entity. Optionally, in the application scenario 5, the communication system shown in FIG. 5 may further include a device other than the PCRF entity in FIG. 1.

In the embodiments of this application, "a plurality of" refers to two or more than two.

Description such as "first", "second" in the embodiments of this application is merely used for indicating and distinguishing between described objects, does not show a sequence, does not indicate a specific limitation on a quantity of devices in the embodiments of this application, and does not constitute any limitation on the embodiments of this application.

In the embodiments of this application, a "connection" means various connection manners such as a direct connection or an indirect connection, for implementing communication between devices. This is not limited in the embodiments of this application.

In the embodiments of this application, a "network" and a "system" express a same concept, and a communication system is a communication network.

The following further describes the communication method and apparatus provided in this application.

Figure 6:
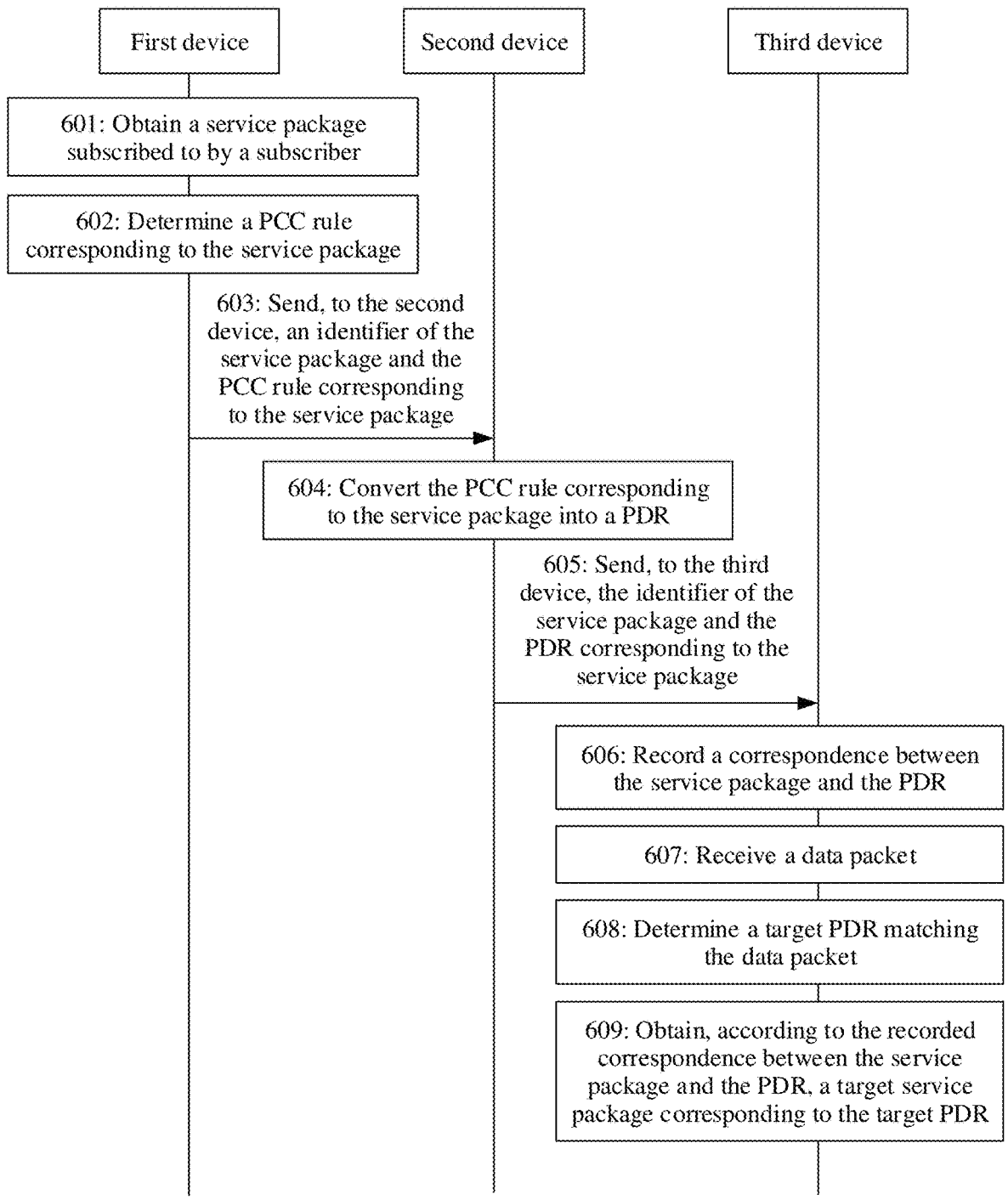
FIG. 6 is a schematic flowchart of a communication method according to an embodiment of this application.

Based on the communication system described in FIG. 4, FIG. 6 is a schematic diagram of a communication method according to an embodiment of this application. Step 601 to step 603 are performed by the first device or a chip in the first device. Step 604 and step 605 are performed by the second device or a chip in the second device. Step 606 to step 609 are performed by the third device or a chip in the third device. The following uses an example in which the first device, the second device, and the third device perform the method for description. As shown in FIG. 6, the communication method includes the following step 601 to step 609.

601: The first device obtains a service package subscribed to by a subscriber.

The communication method shown in FIG. 6 may be applied to any one of the foregoing application scenario 1 to application scenario 3. For example, in FIG. 6, the first device may be the PCF entity, the second device may be the SMF entity, and the third device may be the UPF entity. Alternatively, the first device may be the PCRF entity, the second device may be the PGW-C entity, and the third device may be the PGW-U entity. Alternatively, the first device may be the PCRF entity, the second device may be the TDF-C entity, and the third device may be the TDF-U entity. Certainly, the first device may alternatively be another entity configured to deliver the PCC rule. The second device may alternatively be another control plane device. The third device may alternatively be another user plane device. This is not limited in this embodiment of this application.

The first device records the service package subscribed to by the subscriber. Each subscriber can subscribe to one or more service packages. The first device may obtain, based on a current attribute or status of the subscriber, one or more service packages from service packages to which the subscriber has subscribed. For example, the subscriber has subscribed to three service packages. A service package 1 costs 20 yuan per month, and includes 20 GB of general traffic. A service package 2 costs 20 yuan per month, and includes 30 GB of traffic for an application 1 and 20 GB of traffic for an application 2. A service package 3 costs 10 yuan per month, and includes 10 GB of traffic for an application 3 and 10 GB of traffic for an application 4. The first device obtains one service package, two service packages, or three service packages from the three service packages based on the current attribute or status of the subscriber.

602: The first device determines a policy and charging control (PCC) rule corresponding to the service package.

The first device stores a correspondence between the service package and the PCC rule. The PCC rule is a group of pieces of information used to implement traffic data flow detection and provide corresponding policy control and/or charging control parameters. The PCC rule includes traffic data flow detection information, and includes policy control information and/or charging-related information. For example, the traffic data flow detection information may include a traffic data flow template. The traffic data flow detection information is used to match a data packet. The policy control information is used to perform policy control on a data packet matching the traffic data flow detection information. The charging-related information is used to charge the data packet matching the traffic data flow detection information.

Optionally, the PCC rule may be a dynamic PCC rule, a predefined PCC rule (CRN), or a PCC rule group (CRBN).

The dynamic PCC rule is a rule delivered by the first device to the third device. There are two types of dynamic PCC rules: one is preconfigured on the first device, and the other is dynamically generated on the first device.

Predefined PCC rules are preconfigured on the third device, and the rules may be referenced by the first device.

One PCC rule group may include a plurality of PCC rules. The PCC rule group is preconfigured on the third device, and the PCC rule group may be referenced by the first device.

One service package may correspond to one or more PCC rules. One PCC rule may also correspond to one or more service packages. For example, the correspondence between the service package and the PCC rule stored in the first device is shown in the following Table 1. The service package 1 corresponds to a dynamic PCC rule 1. The service package 2 corresponds to a dynamic PCC rule 2 and a predefined PCC rule 2. The service package 3 corresponds to a dynamic PCC rule 3, a predefined PCC rule 3, and a PCC rule group 3.

TABLE 1

| Service package | PCC rule |
| --- | --- |
| Service package 1 | Dynamic PCC rule 1 |
| Service package 2 | Dynamic PCC rule 2 and the predefined PCC rule 2 |
| Service package 3 | Dynamic PCC rule 3, the predefined PCC rule 3, and the PCC rule group 3 |

In this embodiment of this application, after obtaining the service package, the first device determines, based on the prestored correspondence between the service package and the PCC rule, the PCC rule corresponding to the obtained service package. For example, if the first device obtains the service package 1, the first device determines that a PCC rule corresponding to the service package 1 is the dynamic PCC rule 1. The first device sends, to the second device, an identifier of the service package 1 and the dynamic PCC rule 1.

If the first device obtains the service package 1 and the service package 2, the first device determines that a PCC rule corresponding to the service package 1 is the dynamic PCC rule 1, and determines that PCC rules corresponding to the service package 2 are the dynamic PCC rule 2 and the predefined PCC rule 2. The first device sends, to the second device, an identifier of the service package 1, the dynamic PCC rule 1 corresponding to the service package 1, an identifier of the service package 2, and the dynamic PCC rule 2 and the predefined PCC rule 2 that are corresponding to the service package 2.

If the first device obtains the service package 1, the service package 2, and the service package 3, the first device determines that a PCC rule corresponding to the service package 1 is the dynamic PCC rule 1, determines that PCC rules corresponding to the service package 2 are the dynamic PCC rule 2 and the predefined PCC rule 2, and determines that PCC rules corresponding to the service package 3 are the dynamic PCC rule 3, the predefined PCC rule 3, and the PCC rule group 3. The first device sends, to the second device, an identifier of the service package 1, the dynamic PCC rule 1 corresponding to the service package 1, an identifier of the service package 2, the dynamic PCC rule 2 and the predefined PCC rule 2 that are corresponding to the service package 2, an identifier of the service package 3, and the dynamic PCC rule 3, the predefined PCC rule 3, and the PCC rule group 3 that are corresponding to the service package 3.

603: The first device sends, to the second device, an identifier of the service package and the PCC rule corresponding to the service package.

In this embodiment of this application, after obtaining the service package subscribed to by the subscriber and the PCC rule corresponding to the service package, the first device sends, to the second device, the identifier of the service package and the PCC rule corresponding to the service package. A purpose of sending, by the first device to the second device, the PCC rule corresponding to the service package is to activate the PCC rule corresponding to the service package. The identifier of the service package may be a name or an ID (Identity document) of the service package.

604: The second device converts the PCC rule corresponding to the service package into a packet detection rule (PDR).

In this embodiment of this application, after the second device receives, from the first device, the identifier of the service package and the PCC rule corresponding to the service package, the second device converts the PCC rule corresponding to the service package into the PDR. Optionally, the second device may further store the correspondence between the service package identifier and the PCC rule.

Optionally, the PDR may include one or more pieces of packet detection information (PDI), one or more PDR identifiers, and an identifier of a processing rule corresponding to each PDR identifier. The processing rule includes at least one of a forwarding action rule (FAR), a usage reporting rule (URR), and a QoS enforcement rule (QER).

605: The second device sends, to the third device, the identifier of the service package and the PDR corresponding to the service package.

In this embodiment of this application, after converting the PCC rule corresponding to the service package into the PDR, the second device sends, to the third device, the identifier of the service package and the PDR corresponding to the service package. For example, the service package 1 corresponds to the dynamic PCC rule 1. After receiving the identifier of the service package 1 and the dynamic PCC rule 1, the second device converts the dynamic PCC rule 1 into a PDR, and sends, to the third device, the identifier of the service package 1 and the PDR. After receiving the identifier of the service package 1 and the PDR, the third device records a correspondence between the service package 1 and the PDR.

In an optional implementation, the identifier of the service package is carried in an information element of the PDR corresponding to the service package and sent to the third device. Alternatively, when the second device only sends an identifier of one service package, the identifier of the service package is carried in an information element of a session establishment request and sent to the third device. Based on this optional implementation, the third device can accurately determine a correspondence between the service package and the PDR.

606: The third device records the correspondence between the service package and the PDR.

In this embodiment of this application, after the third device receives, from the second device, the identifier of the service package and the PDR corresponding to the service package, the third device records the correspondence between the service package and the PDR.

607: The third device receives a data packet.

After recording the correspondence between the service package and the PDR, the third device receives the data packet.

The data packet may be an uplink data packet or a downlink data packet.

608: The third device determines a target PDR matching the data packet.

In this embodiment of this application, after receiving the data packet, the third device determines the target PDR matching the data packet.

The third device matches attribute information of the data packet with packet detection information in the PDR. If the matching succeeds, it is determined that the data packet matches the PDR.

For example, a PDR 1 and a PDR 2 of a subscriber 1 are activated in the third device. The PDR 1 corresponds to the service package 1, and the PDR 2 corresponds to the service package 2. After receiving a data packet accessed by the subscriber 1, the third device matches attribute information of the data packet with packet detection information in the PDR 1 and packet detection information in the PDR 2. If the attribute information of the data packet matches the packet detection information in the PDR 1, the data packet matches the PDR 1. Therefore, the PDR 1 is the target PDR. The third device determines, according to the pre-recorded correspondence between the service package and the PDR, that the PDR 1 corresponds to the service package 1.

609: The third device obtains, according to the recorded correspondence between the service package and the PDR, a target service package corresponding to the target PDR.

The obtained target service package is a service package to which the data packet received by the third device belongs. It can be learned that, by implementing the method described in FIG. 6, it can help the device accurately determine the service package to which the received data packet belongs.

After obtaining the target service package corresponding to the target PDR, the third device can perform a related operation based on the service package.

The following describes a process of the related operation that can be performed by the third device based on the service package.

Figure 7A:
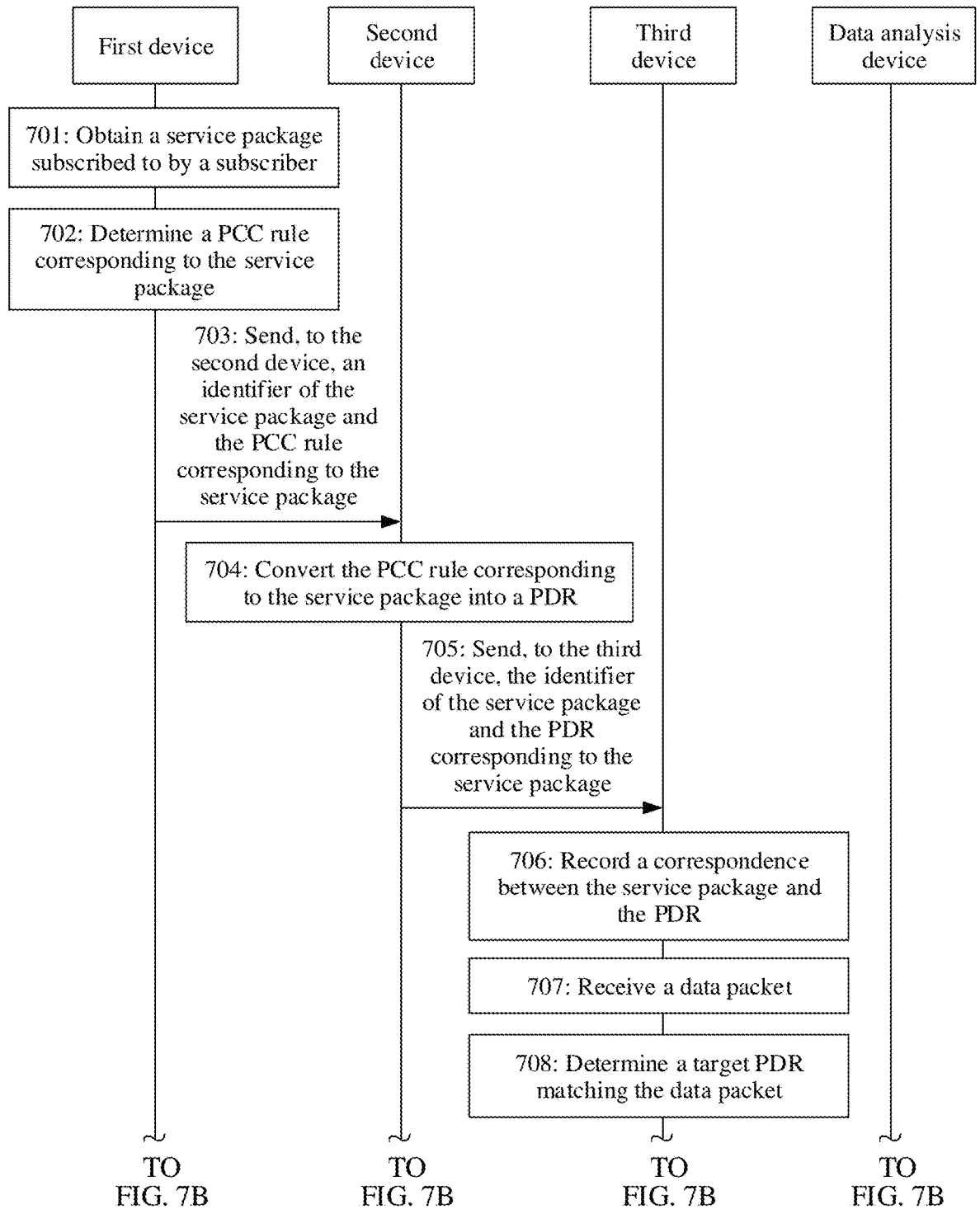
FIG. 7A is a schematic flowchart of a communication method according to an embodiment of this application.
Figure 7B:
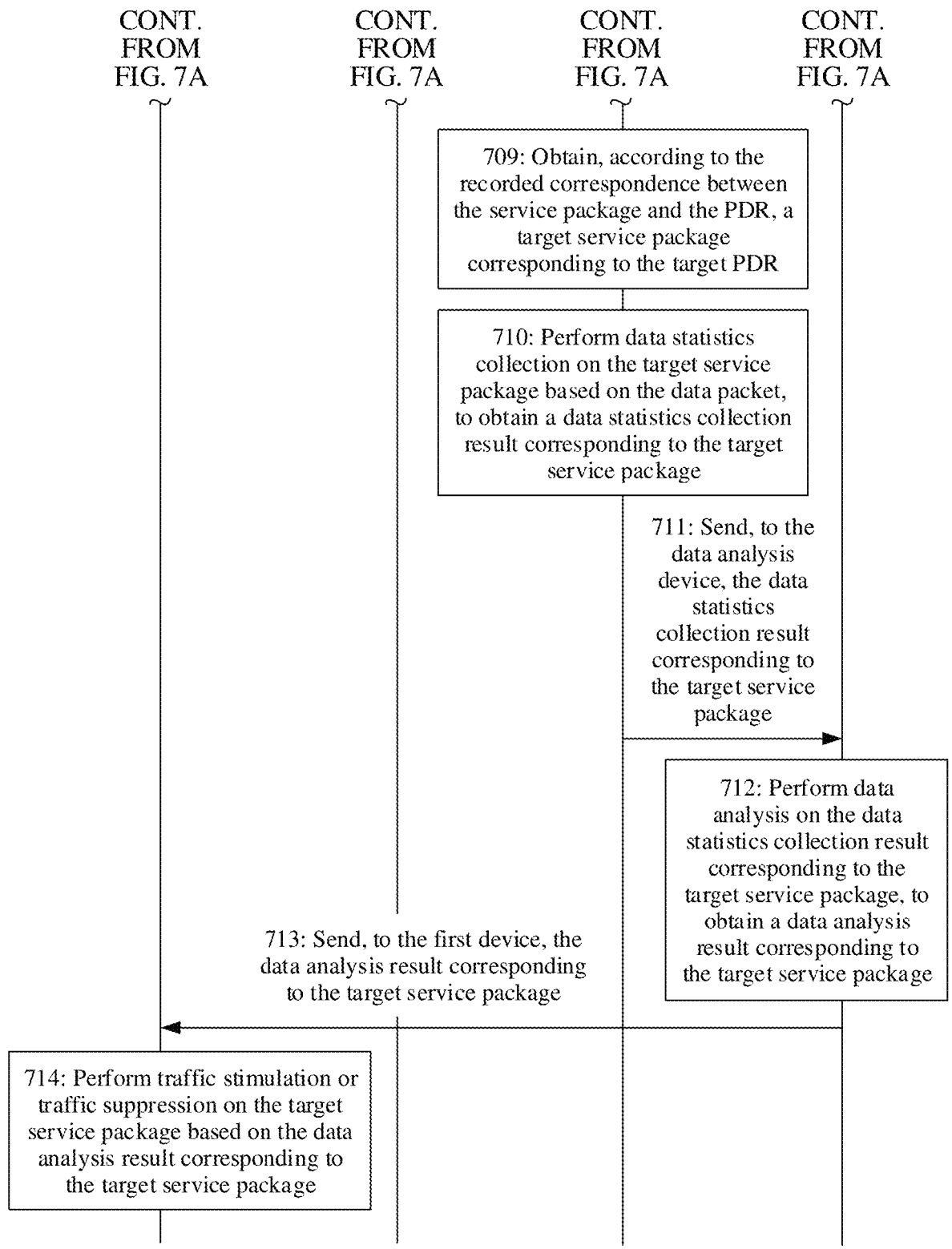
FIG. 7B is a schematic flowchart of a communication method according to an embodiment of this application.

FIG. 7A and FIG. 7B are a schematic flowchart of another communication method according to an embodiment of this application. Specific implementations of step 701 to step 709 are the same as the specific implementations of step 601 to step 609. Details are not described herein. As shown in FIG. 7A and FIG. 7B, after obtaining the target service package corresponding to the target PDR, the third device may further perform the following step 710 to step 714.

710: The third device performs data statistics collection on the target service package based on the data packet, to obtain a data statistics collection result corresponding to the target service package.

For example, the target PDR is the PDR 1, and the target service package corresponding to the target PDR is the service package 1. The third device performs data statistics collection on the service package 1 based on the data packet, to obtain the data statistics collection result. Optionally, the third device may further execute a charging and control policy defined in the PDR 1. Certainly, the third device may not perform step 710, and the third device may perform another operation based on the target service package. This is not limited in this embodiment of this application.

Optionally, the data statistics collection result may include one or more of a quantity of subscribers using the service package 1, traffic usage information of the service package 1, usage duration information of the service package 1, traffic usage information of applications in the service package 1, usage duration information of the applications in the service package 1, and a quantity of subscribers sharing a hotspot in the service package 1.

In an optional implementation, the traffic usage information of the service package 1 may be traffic usage on the service package 1. For example, the traffic usage on the service package 1 may be total traffic usage on the service package 1 of all subscribers. In other words, the third device may collect statistics on the total traffic usage on the service package 1 of the all subscribers. Alternatively, the traffic usage information of the service package 1 may be a traffic usage proportion of the service package 1. For example, there are 10 service packages in total in the third device. If the total traffic usage on the service package 1 of the all subscribers is 10 GB, and total traffic usage on the 10 service packages is 200 GB, the traffic usage proportion of the service package 1 is 1/20.

In an optional implementation, the usage duration information of the service package 1 may be usage duration of the service package 1. For example, the usage duration of the service package 1 may be total usage duration on the service package 1 of the all subscribers. In other words, the third device may collect statistics on the total usage duration on the service package 1 of the all subscribers. Alternatively, the usage duration information of the service package 1 may be a usage duration proportion of the service package 1. For example, there are 10 service packages in total in the third device. If the total usage duration on the service package 1 of the all subscribers is 100 hours, and total usage duration of the 10 service packages is 2000 hours, the usage duration proportion of the service package 1 is 1/20.

In an optional implementation, the traffic usage information of the applications in the service package 1 may be traffic usage on the applications in the service package 1. For example, the traffic usage on the applications in the service package 1 may be total traffic usage, of the all subscribers, on the applications in the service package 1. In other words, the third device may collect statistics on the total traffic usage, of the all subscribers, on the applications in the service package 1. For example, the subscriber 1 uses, in the service package 1, 10 GB traffic of the application 1 and 20 GB traffic of the application 2. A subscriber 2 uses, in the service package 1, 20 GB traffic of the application 1 and 20 GB traffic of the application 2. The third device may obtain, by performing statistics collection in the service package 1, that the total traffic usage on the application 1 is 30 GB, and the total traffic usage on the application 2 is 40 GB.

Alternatively, the traffic usage information of the applications in the service package 1 may be traffic usage proportions of the applications. For example, the total traffic usage, of the all subscribers, on the application 1 in the service package 1 is 30 GB, and the total traffic usage, of the all subscribers, on the application 2 in the service package 1 is 40 GB. In the service package 1, the traffic usage proportion of the application 1 is 3/7, and the traffic usage proportion of the application 2 is 4/7.

In an optional implementation, the usage duration information of the applications in the service package 1 may be usage duration on the applications in the service package 1. For example, the usage duration on the applications in the service package 1 may be total usage duration, of the all subscribers, on the applications in the service package 1. In other words, the third device may collect statistics on the total usage duration, of the all subscribers, on the applications in the service package 1. Alternatively, the usage duration information of the applications in the service package 1 may be usage duration proportions of the applications. For example, the total usage duration on the application 1 in the service package 1 is 100 hours, and the total usage duration on the application 2 in the service package 1 is 200 hours. The usage duration proportion of the application 1 in the service package 1 is 1/3, and the usage duration proportion of the application 2 in the service package 1 is 2/3.

After obtaining the data statistics collection result corresponding to the target service package, the third device may perform step 711. Alternatively, after obtaining the data statistics collection result corresponding to the target service package, the third device does not perform step 711, and performs another operation. For example, the data statistics collection result is sent to the first device or the second device, or the data statistics collection result is directly analyzed. This is not limited in this embodiment of this application.

711: The third device sends, to a data analysis device, the data statistics collection result corresponding to the target service package.

712: The data analysis device performs data analysis on the data statistics collection result corresponding to the target service package, to obtain a data analysis result corresponding to the target service package.

After receiving the data statistics collection result corresponding to the target service package, the data analysis device performs data analysis on the data statistics collection result corresponding to the target service package, to obtain the data analysis result corresponding to the target service package.

An example in which the target service package is the service package 1 is used. As described above, the data statistics collection result corresponding to the service package 1 may be the one or more of the quantity of subscribers using the service package 1, the traffic usage information of the service package 1, the usage duration information of the service package 1, the traffic usage information of the applications in the service package 1, the usage duration information of the applications in the service package 1, and the quantity of subscribers sharing the hotspot in the service package 1.

An example in which the data statistics collection result includes the traffic usage information of the service package 1 is used. If the traffic usage information of the service package 1 is the total traffic usage on the service package 1 of the all subscribers, a specific implementation in which the data analysis device performs data analysis on the data statistics collection result corresponding to the service package 1, to obtain the data analysis result corresponding to the service package 1, may be as follows: The data analysis device determines whether the total traffic usage on the service package 1 is greater than a first threshold. An obtained determining result is the data analysis result. If the total traffic usage on the service package 1 is greater than the first threshold, it indicates that the service package 1 is frequently used and is a mainstream service package. Alternatively, a specific implementation in which the data analysis device performs data analysis on the data statistics collection result corresponding to the service package 1, to obtain the data analysis result corresponding to the service package 1, may be as follows: The data analysis device sorts all the service packages based on the total traffic usage on the service packages, to obtain a sorting result of the service packages. The sorting result is the data analysis result. For example, the all service packages are sorted in descending order based on the total traffic usage on the service packages. A service package is ranked in front of a preset location, and it indicates that the service package is frequently used and is a mainstream service package. It can be learned that the data analysis result can be used to determine which service packages are mainstream service packages, to further perform traffic stimulation or traffic suppression on the mainstream service package. Similarly, the traffic usage information of the service package 1 is the total traffic usage proportion of the service package 1. Details are not described herein. When the data statistics collection result includes the quantity of subscribers using the service package 1 and the usage duration information of the service package 1, a specific implementation of performing data analysis on the data statistics collection result is the same. Details are not described herein. For example, data analysis is performed on the quantity of subscribers using the service package 1, the traffic usage information of the service package 1, or the usage duration information of the service package 1, to obtain the data analysis result. The data analysis result may be used to determine whether the service package 1 is the mainstream service package. Alternatively, another analysis operation may be performed on the quantity of subscribers using the service package 1, the traffic usage information of the service package 1, or the usage duration information of the service package 1. This is not limited in this embodiment of this application.

For another example, an example in which the data statistics collection result includes the traffic usage information of the service package 1 and the traffic usage information of the applications in the service package 1 is used. If the traffic usage information of the service package 1 is the total traffic usage on the service package 1 of the all subscribers, and the traffic usage information of the applications in the service package 1 is the total traffic usage, of the all subscribers, on the applications in the service package 1, a specific implementation in which the data analysis device performs data analysis on the data statistics collection result corresponding to the service package 1, to obtain the data analysis result corresponding to the service package 1, may be as follows: The data analysis device determines whether the total traffic usage on the service package 1 is greater than a first threshold, and determines whether the total traffic usage on the applications in the service package 1 is greater than a second threshold. An obtained determining result is the data analysis result. If the total traffic usage on the service package 1 is greater than the first threshold, it indicates that the service package 1 is frequently used and is a mainstream service package. If the total traffic usage on the application in the service package 1 is greater than the second threshold, it indicates that the application is a mainstream application in the service package 1. Alternatively, a specific implementation in which the data analysis device performs data analysis on the data statistics collection result corresponding to the service package 1, to obtain the data analysis result corresponding to the service package 1, may be as follows: The data analysis device sorts all the service packages based on the total traffic usage on the service packages, to obtain a first sorting result of the service packages. The data analysis device sorts the applications in the service package 1 based on the total traffic usage on the applications in the service package 1, to obtain a second sorting result of the applications in the service package 1. The first sorting result and the second sorting result are data analysis results. It can be learned that the data analysis result can be used to determine which service packages are mainstream service packages and which applications in the service packages are mainstream applications, to further perform traffic stimulation or traffic suppression on the mainstream application in the mainstream service package. For example, data analysis is performed on the quantity of subscribers using the service package 1, the traffic usage information of the service package 1, the usage duration information of the service package 1, the traffic usage information of the applications in the service package 1, or the usage duration information of the applications in the service package 1, to obtain the data analysis result. The data analysis result may be used to determine whether the service package 1 is the mainstream service package, and used to determine the mainstream application in the service package 1.

For another example, an example in which the data statistics collection result includes the traffic usage information of the service package 1 and the quantity of subscribers sharing the hotspot in the service package 1 is used. If the traffic usage information of the service package 1 is the total traffic usage on the service package 1 of the all subscribers, a specific implementation in which the data analysis device performs data analysis on the data statistics collection result corresponding to the service package 1, to obtain the data analysis result corresponding to the service package 1, may be as follows: The data analysis device determines whether the total traffic usage on the service package 1 is greater than a first threshold, and determines whether the quantity of subscribers sharing the hotspot in the service package 1 is greater than a third threshold. An obtained determining result is the data analysis result. If the total traffic usage on the service package 1 is greater than the first threshold, it indicates that the service package 1 is frequently used and is a mainstream service package. If the quantity of subscribers sharing the hotspot in the service package 1 is greater than the third threshold, it indicates that there are excessive subscribers sharing the hotspot in the service package 1. Alternatively, a specific implementation in which the data analysis device performs data analysis on the data statistics collection result corresponding to the service package 1, to obtain the data analysis result corresponding to the service package 1, may be as follows: The data analysis device sorts all the service packages based on the total traffic usage on the service packages, to obtain a first sorting result of the service packages. The data analysis device determines whether the quantity of subscribers sharing the hotspot in the service package 1 is greater than the third threshold. The obtained determining result and the first sorting result are data analysis results. It can be learned that the data analysis result can be used to determine which service packages are mainstream service packages and which service packages have excessive subscribers sharing a hotspot, to further suppress traffic of a low-value mainstream service package having excessive subscribers sharing a hotspot.

Certainly, the data analysis device may further perform another data analysis operation, for example, generating a report, on the foregoing data statistics collection result. This is not limited in this embodiment of this application.

713: The data analysis device sends, to the first device, the data analysis result corresponding to the target service package.

714: The first device performs traffic stimulation or traffic suppression on the target service package based on the data analysis result corresponding to the target service package.

After receiving, from the data analysis device, the data analysis result corresponding to the target service package, the first device performs traffic stimulation or traffic suppression on the target service package based on the data analysis result corresponding to the target service package.

In an optional implementation, if the target service package is a high-value service package, the first device may perform traffic stimulation on the target service package based on the data analysis result corresponding to the target service package. The high-value service package is a service package whose price per bit of traffic is higher than a threshold. In other words, the high-value service package is a service package with a high price per bit of traffic.

For example, the target service package is the high-value service package, and a specific implementation in which the first device performs traffic stimulation on the target service package based on the data analysis result corresponding to the target service package is as follows: If determining, based on the data analysis result corresponding to the target service package, that the target service package is the mainstream service package, the first device performs traffic stimulation on the target service package. A specific implementation in which the first device performs traffic stimulation on the target service package may be improving QoS for a service in the target service package, improving transmission quality of a transmission control protocol (TCP) transport layer, or the like. The first device may update a parameter in a PCC rule corresponding to the target service package, to improve the QoS for the service in the target service package or improve the transmission quality of the TCP transport layer. Alternatively, the first device may delete an existing PCC rule corresponding to the target service package, and generate a new PCC rule for the target service package. The PCC rule may be used to improve the QoS for the service in the target service package or improve the transmission quality of the TCP transport layer. Alternatively, the first device may not delete an existing PCC rule corresponding to the target service package. The first device may additionally generate an overlay rule. The overlay rule may be used to improve the QoS for the service in the target service package or improve the transmission quality of the TCP transport layer.

For another example, the target service package is the high-value service package, and a specific implementation in which the first device performs traffic stimulation on the target service package based on the data analysis result corresponding to the target service package is as follows: If determining, based on the data analysis result corresponding to the target service package, that the target service package is the mainstream service package, and that a first application in the target service package is the mainstream application, the first device performs traffic stimulation on the first application in the target service package. A specific implementation in which the first device performs traffic stimulation on the target service package may be improving QoS for the first application in the target service package, improving transmission quality of a transmission control protocol (TCP) transport layer, or the like. The first device may update a parameter in a PCC rule corresponding to the target service package, to improve the QoS for the first application in the target service package or improve the transmission quality of the TCP transport layer. Alternatively, the first device may delete an existing PCC rule corresponding to the target service package, and generate a new PCC rule for the target service package. The PCC rule may be used to improve the QoS for the first application in the target service package or improve the transmission quality of the TCP transport layer. Alternatively, the first device may not delete an existing PCC rule corresponding to the target service package. The first device may additionally generate an overlay rule. The overlay rule may be used to improve the QoS for the first application in the target service package or improve the transmission quality of the TCP transport layer.

In an optional implementation, if the target service package is a low-value service package, the first device may perform traffic suppression on the target service package based on the data analysis result corresponding to the target service package. The low-value service package is a service package whose price per bit of traffic is lower than a threshold. In other words, the low-value service package is a service package with a low price per bit of traffic.

For example, the target service package is the low-value service package, and a specific implementation in which the first device performs traffic suppression on the target service package based on the data analysis result corresponding to the target service package is as follows: If determining, based on the data analysis result corresponding to the target service package, that the target service package is the mainstream service package, the first device performs traffic suppression on the target service package. A specific implementation in which the first device performs traffic suppression on the target service package may be reducing bandwidth, QoS quality, or the like for a service in the target service package. The first device may update a parameter in a PCC rule corresponding to the target service package, to reduce the bandwidth or the QoS quality for the service in the target service package. Alternatively, the first device may delete an existing PCC rule corresponding to the target service package, and generate a new PCC rule for the target service package. The PCC rule may be used to reduce the bandwidth or the QoS quality for the service in the target service package. Alternatively, the first device may not delete an existing PCC rule corresponding to the target service package. The first device may generate an overlay rule for the target service package. The overlay rule may be used to reduce the bandwidth or the QoS quality for the service in the target service package.

For another example, the target service package is a low-value service package, and a specific implementation in which the first device performs traffic suppression on the target service package based on the data analysis result corresponding to the target service package is as follows: If determining, based on the data analysis result corresponding to the target service package, that the target service package is the mainstream service package, and that a first application in the target service package is the mainstream application, the first device performs traffic suppression on the first application in the target service package. A specific implementation in which the first device performs traffic suppression on the first application in the target service package may be reducing bandwidth, QoS quality, or the like for the first application in the target service package. The first device may update a parameter in a PCC rule corresponding to the target service package, to reduce the bandwidth or the QoS quality for the first application in the target service package. Alternatively, the first device may delete an existing PCC rule corresponding to the target service package, and generate a new PCC rule for the target service package. The PCC rule may be used to reduce the bandwidth or the QoS quality for the first application in the target service package. Alternatively, the first device may not delete an existing PCC rule corresponding to the target service package. The first device may generate an overlay rule for the target service package. The overlay rule may be used to reduce the bandwidth or the QoS quality for the first application in the target service package.

For another example, the target service package is a low-value service package, and a specific implementation in which the first device performs traffic suppression on the target service package based on the data analysis result corresponding to the target service package is as follows: If determining, based on the data analysis result corresponding to the target service package, that the target service package is the mainstream service package, and that a quantity of subscribers sharing a hotspot in the target service package is greater than the third threshold, the first device performs traffic suppression on the target service package. A specific implementation in which the first device performs traffic suppression on the target service package may be disabling sharing of the hotspot in the target service package. The first device may delete an existing PCC rule corresponding to the target service package, and generate a new PCC rule for the target service package. The PCC rule may be used to disable the sharing of the hotspot in the target service package. Alternatively, the first device may not delete an existing PCC rule corresponding to the target service package. The first device may generate an overlay rule for the target service package. The overlay rule may be used to disable the sharing of the hotspot in the target service package.

In an optional implementation, step 713 and step 714 may not be performed. After the data analysis device performs data analysis on the data statistics collection result corresponding to the target service package, and obtains the data analysis result corresponding to the target service package, the data analysis device may send, to the second device, the data analysis result corresponding to the target service package. After receiving, from the data analysis device, the data analysis result corresponding to the target service package, the second device performs traffic stimulation or traffic suppression on the target service package based on the data analysis result corresponding to the target service package. Similarly, if the target service package is a high-value service package, the second device may perform traffic stimulation on the target service package based on the data analysis result corresponding to the target service package. If the target service package is a low-value service package, the second device may perform traffic suppression on the target service package based on the data analysis result corresponding to the target service package. The second device may generate an overlay rule for the target service package. The overlay rule may be used to perform traffic stimulation or traffic suppression on the target service package.

In an optional implementation, step 713 and step 714 may not be performed. After the data analysis device performs data analysis on the data statistics collection result corresponding to the target service package, and obtains the data analysis result corresponding to the target service package, the data analysis device may send, to the third device, the data analysis result corresponding to the target service package. After receiving, from the data analysis device, the data analysis result corresponding to the target service package, the third device performs traffic stimulation or traffic suppression on the target service package based on the data analysis result corresponding to the target service package. Similarly, if the target service package is a high-value service package, the third device may perform traffic stimulation on the target service package based on the data analysis result corresponding to the target service package. If the target service package is a low-value service package, the third device may perform traffic suppression on the target service package based on the data analysis result corresponding to the target service package. The third device may generate an overlay rule for the target service package. The overlay rule may be used to perform traffic stimulation or traffic suppression on the target service package.

It can be learned that, by implementing the method described in FIG. 7A and FIG. 7B, traffic stimulation or traffic suppression can be performed based on the service package.

Figure 8A:
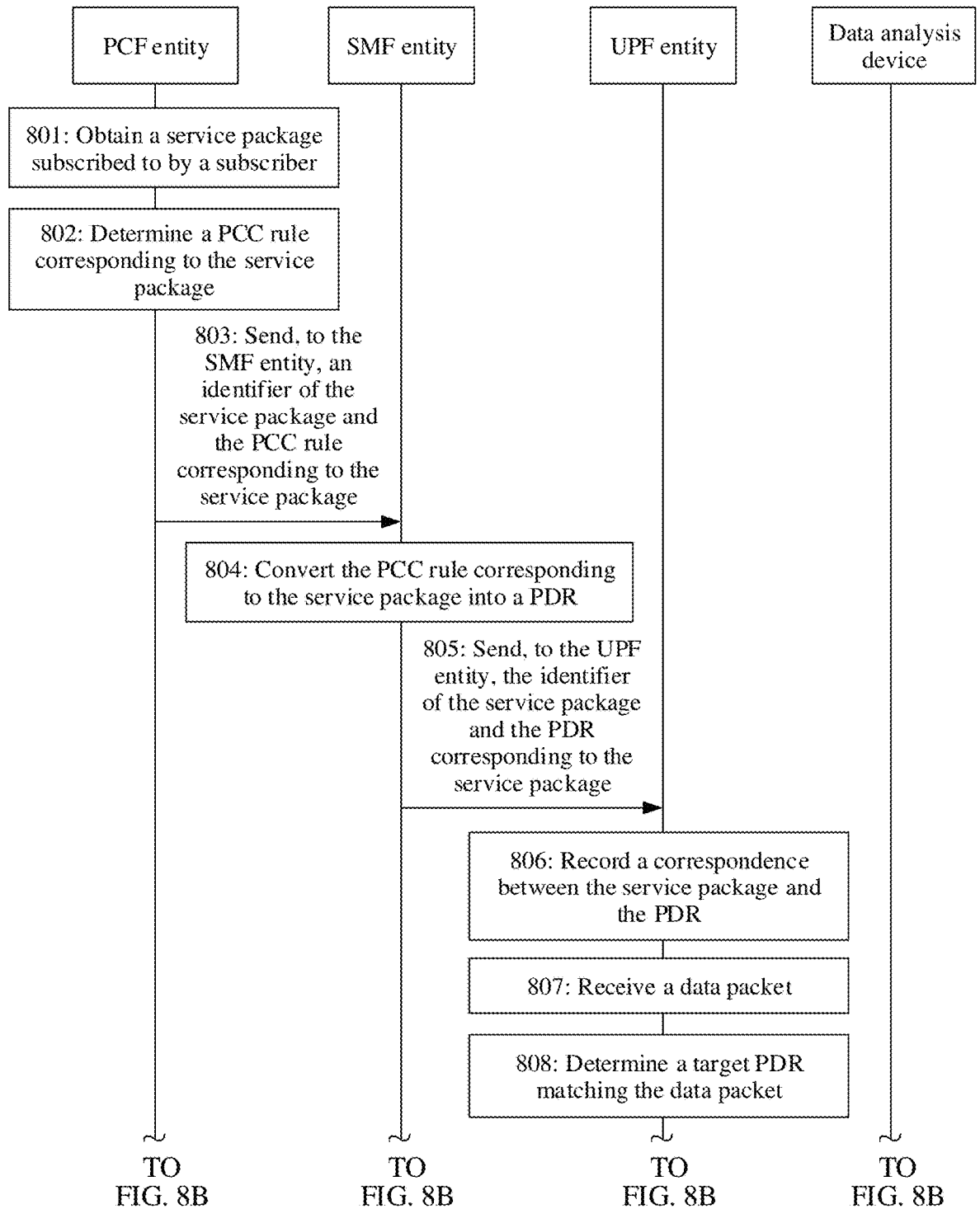
FIG. 8A is a schematic flowchart of a communication method according to an embodiment of this application.
Figure 8B:
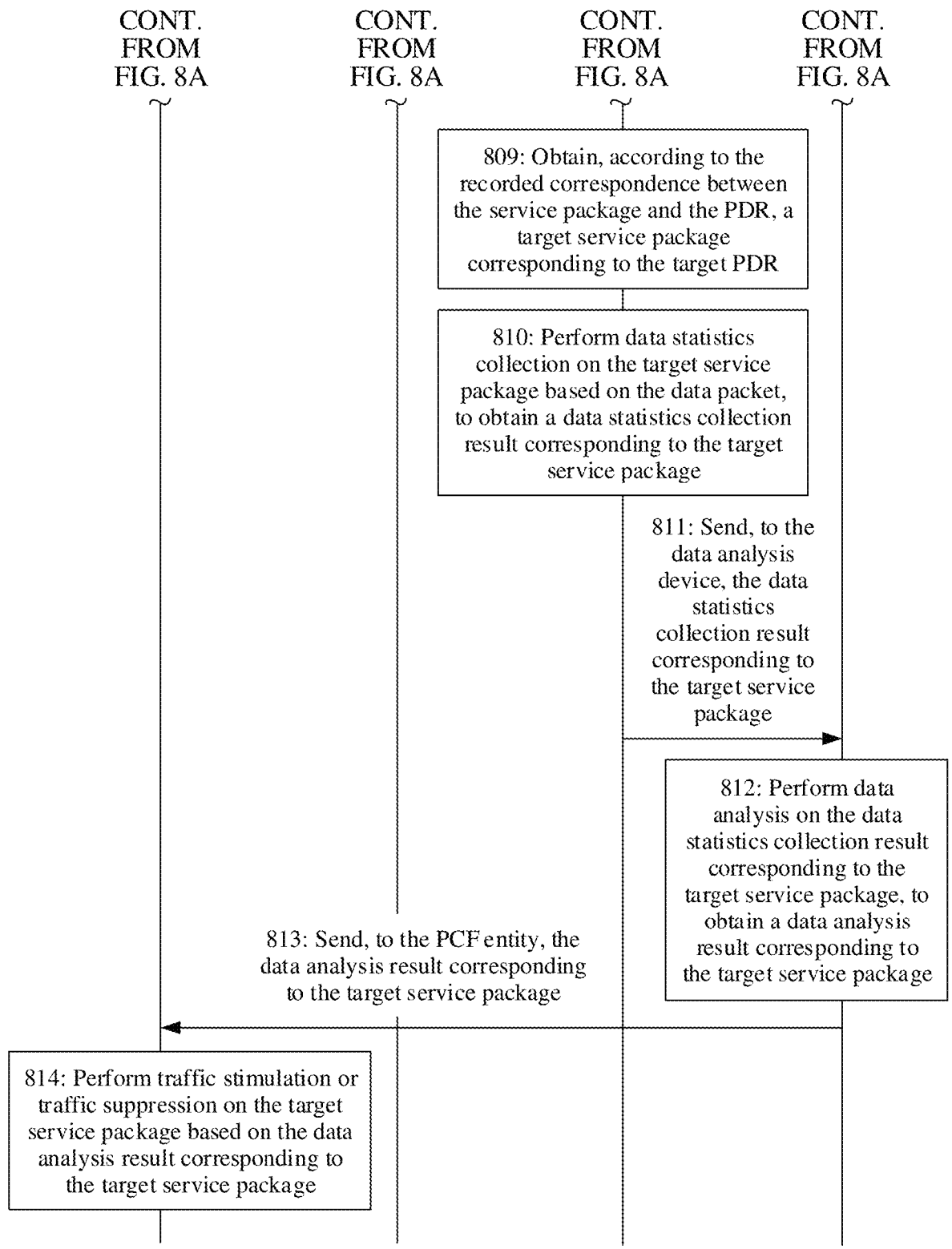
FIG. 8B is a schematic flowchart of a communication method according to an embodiment of this application.

The following further describes the communication method provided in this application based on the foregoing application scenario 1. FIG. 8A and FIG. 8B are a schematic flowchart of still another communication method according to an embodiment of this application. Step 801 to step 803, and step 814 are performed by the PCF entity or a chip in the PCF entity. Step 804 and step 805 are performed by the SMF entity or a chip in the SMF entity. Step 806 to step 811 are performed by the UPF entity or a chip in the UPF entity. Step 812 and step 813 are performed by a data analysis device or a chip in the data analysis device. The following uses an example in which the PCF entity, the SMF entity, the UPF entity, and the data analysis device perform the method for description. As shown in FIG. 8A and FIG. 8B, the communication method includes the following step 801 to step 814.

801: The PCF entity obtains a service package subscribed to by a subscriber.

Optionally, a user terminal may send a session establishment request to the SMF entity by using the RAN or the AMF. After receiving the session establishment request, the SMF entity sends an Npcf_SMPolicyControl_Create message to the PCF entity. After receiving the Npcf_SMPolicyControl_Create message, the PCF entity is triggered to obtain the service package subscribed to by the subscriber. Alternatively, a user terminal may send a session update request to the SMF entity by using the RAN or the AMF. After receiving the session update request, the SMF entity sends an Npcf_SMPolicyControl_Update message to the PCF entity. After receiving the Npcf_SMPolicyControl_Update message, the PCF entity is triggered to obtain the service package subscribed to by the subscriber. Alternatively, the PCF entity may actively obtain the service package subscribed to by the subscriber. Alternatively, the PCF entity may be triggered in another manner to obtain the service package subscribed to by the subscriber.

802: The PCF entity determines a PCC rule corresponding to the service package.

For a specific implementation of step 802, refer to the specific implementation of step 602. Details are not described herein.

803: The PCF entity sends, to the SMF entity, an identifier of the service package and the PCC rule corresponding to the service package.

In an optional implementation, the identifier of the service package is carried in an information element of the corresponding PCC rule and sent to the SMF entity. For example, information elements included in the PCC rule may be shown as follows. An information element pccServiceName/pccServiceID indicates the identifier of the service package. Optionally, the identifier of the service package may be carried in an attribute-value pair (AVP) of the corresponding PCC rule. Based on this optional implementation, the SMF entity can accurately determine a correspondence between the service package and the PCC rule.

PccRule:
  type: object
  properties:
    flowInfos:
      type: array
      items:
        $ref: '#/components/schemas/FlowInformation' minItems: 1
      description: An array of IP flow packet filter information.
    appId:
      type: string
      description: A reference to the application detection filter configured at the UPF.
    contVer:
    $ref: 'TS29514_Npcf_PolicyAuthorization.yaml#/components/schemas/ContentVersion'
    pccRuleId:
      type: string
      description: Univocally identifies the PCC rule within a PDU session.
    pccServiceName/pccServiceID:
      type: string
      description: the Service Name or Service ID of this pccRule.

```
precedence:
    $ref: 'TS29571_CommonData.yaml#/compo-
        nents/schemas/Uinteger' description: Deter-
        mines the order in which this PCC rule is
        applied relative to other PCC rules within the
        same PDU session.
afSigProtocol:
    $ref: '#/components/schemas/AfSigProtocol'
appReloc:
    type: boolean
    description: Indication of application relocation
        possibility.
refQosData:
    type: array
    items:
        type: string
    minItems: 1
    maxItems: 1
    description: A reference to the QoSData policy
        type decision type. It is the qosId described in
        subclause 5.6.2.8. (NOTE)
refTcData:
    type: array
    items:
        type: string
    minItems: 1
    maxItems: 1
    description: A reference to the TrafficControlData
        policy decision type. It is the tcId described in
        subclause 5.6.2.10. (NOTE)
refChgData:
    type: array
    items:
        type: string
    minItems: 1
    maxItems: 1
    description: A reference to the ChargingData
        policy decision type. It is the chgId described in
        subclause 5.6.2.11. (NOTE)
    nullable: true
refUmData:
    type: array
    items:
        type: string
    minItems: 1
    maxItems: 1
    description: A reference to UsageMonitoringData
        policy decision type. It is the umId described in
        subclause 5.6.2.12. (NOTE)
    nullable: true
refCondData:
    type: string
    description: A reference to the condition data. It is
        the condId described in subclause 5.6.2.9.
    nullable: true
required:
    pccRuleId
nullable: true
```

In an optional implementation, the PCF entity only sends an identifier of one service package. The identifier of the service package is carried in an information element of a session rule and sent to the SMF entity. For example, information elements included in the session rule may be shown as follows. An information element sessService-Name/sessServiceID indicates the identifier of the service package. Optionally, the identifier of the service package may be carried in an AVP of the corresponding session rule.

Based on this optional implementation, the SMF entity can accurately determine a correspondence between the service package and the PCC rule.

```
SessionRule:
    type: object
    properties:
        authSessAmbr:
            $ref: 'TS29571_CommonData.yaml#/compo-
                nents/schemas/Ambr'
        authDefQos:
            $ref: '#/components/schemas/AuthorizedDefault-
                Qos'
        sessRuleId:
            type: string
            description: Univocally identifies the session rule
                within a PDU session.
        sessServiceName/sessServiceID:
            type: string
            description: the Service Name or Service ID of
                this sessRule.
        refUmData:
            type: string
            description: A reference to UsageMonitoringData
                policy decision type. It is the umId described in
                subclause 5.6.2.12.
            nullable: true
        refCondData:
            type: string
            description: A reference to the condition data. It is
                the condId described in subclause 5.6.2.9.
            nullable: true
    required:
        sessRuleId
    nullable: true
```

804: The SMF entity converts the PCC rule corresponding to the service package into a PDR.

After receiving the identifier of the service package and the PCC rule corresponding to the service package, the SMF entity converts the PCC rule corresponding to the service package into the PDR.

805: The SMF entity sends, to the UPF entity, the identifier of the service package and the PDR corresponding to the service package.

In an optional implementation, the identifier of the service package is carried in an information element of the PDR corresponding to the service package and sent to the UPF entity. For example, the PDR may include an information element carrying a PDR identifier, an information element carrying a FAR ID, an information element carrying a URR ID, an information element carrying a QER ID, the information element carrying the identifier of the service package, and the like. Based on this optional implementation, the UPF entity can accurately determine a correspondence between the service package and the PDR.

In an optional implementation, the SMF entity only sends an identifier of one service package. The identifier of the service package is carried in an information element of the session establishment request and sent to the UPF entity. For example, the session establishment request may include the information element carrying the PDR, an information element carrying a node identifier (Node ID), the information element carrying the identifier of the service package, and the like. Based on this optional implementation, the UPF entity can accurately determine a correspondence between the service package and the PDR.

806: The UPF entity records the correspondence between the service package and the PDR.

After receiving the identifier of the service package and the PDR corresponding to the service package, the UPF entity records the correspondence between the service package and the PDR.

807: The UPF entity receives a data packet.

808: The UPF entity determines a target PDR matching the data packet.

809: The UPF entity obtains, according to the recorded correspondence between the service package and the PDR, a target service package corresponding to the target PDR.

For specific implementations of step 806 to step 809, refer to the specific implementations of step 606 to step 609. Details are not described herein.

810: The UPF entity performs data statistics collection on the target service package based on the data packet, to obtain a data statistics collection result corresponding to the target service package.

811: The UPF entity sends, to the data analysis device, the data statistics collection result corresponding to the target service package.

812: The data analysis device performs data analysis on the data statistics collection result corresponding to the target service package, to obtain a data analysis result corresponding to the target service package.

813: The data analysis device sends, to the PCF entity, the data analysis result corresponding to the target service package.

814: The PCF entity performs traffic stimulation or traffic suppression on the target service package based on the data analysis result corresponding to the target service package.

For specific implementations of step 810 to step 814, refer to the specific implementations of step 710 to step 714. Details are not described herein.

In an optional implementation, step 813 and step 814 may not be performed. After the data analysis device performs data analysis on the data statistics collection result corresponding to the target service package, and obtains the data analysis result corresponding to the target service package, the data analysis device may send, to the SMF entity, the data analysis result corresponding to the target service package. After receiving, from the data analysis device, the data analysis result corresponding to the target service package, the SMF entity performs traffic stimulation or traffic suppression on the target service package based on the data analysis result corresponding to the target service package.

In an optional implementation, step 813 and step 814 may not be performed. After the data analysis device performs data analysis on the data statistics collection result corresponding to the target service package, and obtains the data analysis result corresponding to the target service package, the data analysis device may send, to the UPF entity, the data analysis result corresponding to the target service package. After receiving, from the data analysis device, the data analysis result corresponding to the target service package, the UPF entity performs traffic stimulation or traffic suppression on the target service package based on the data analysis result corresponding to the target service package.

Figure 9A:
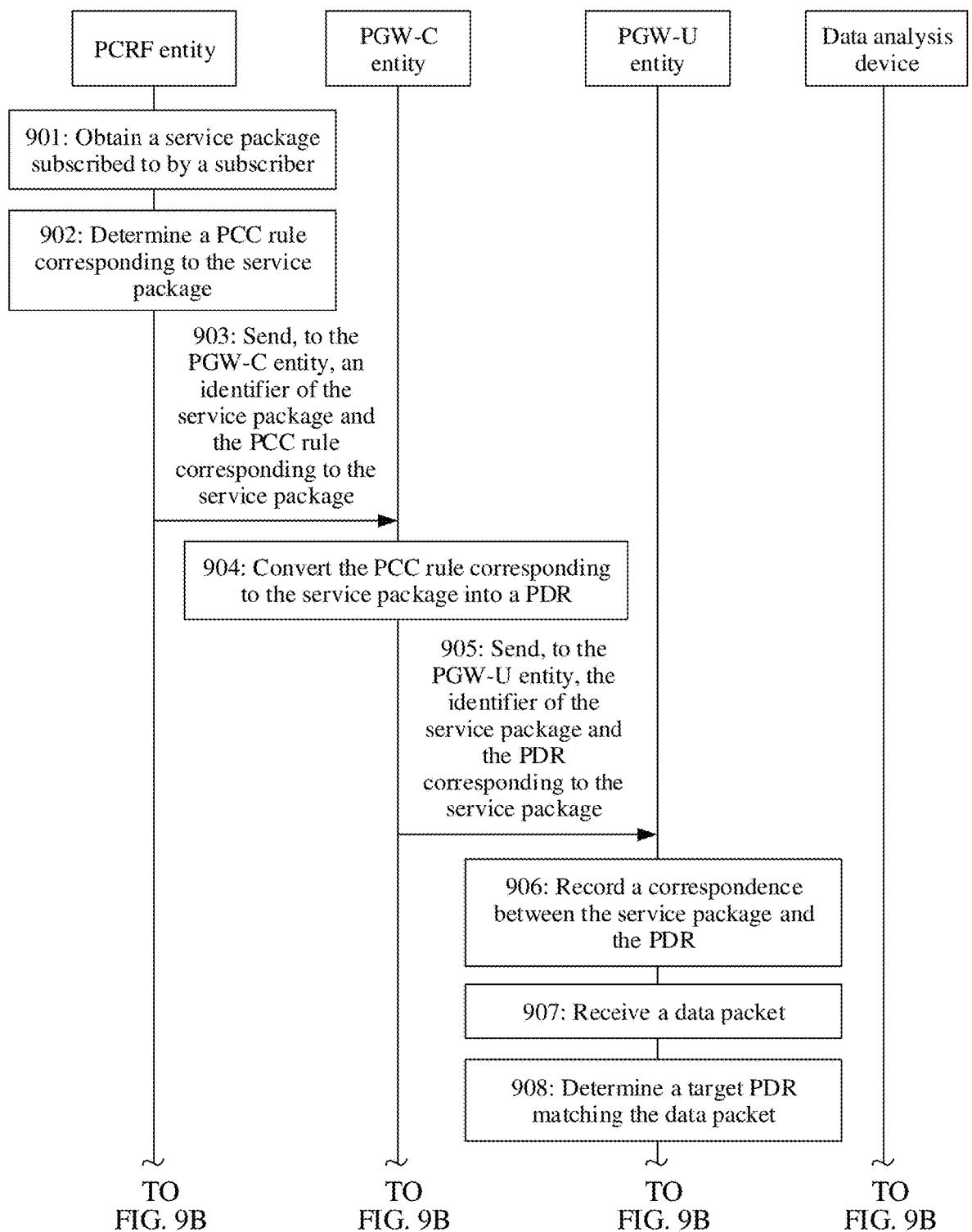
FIG. 9A is a schematic flowchart of a communication method according to an embodiment of this application.
Figure 9B:
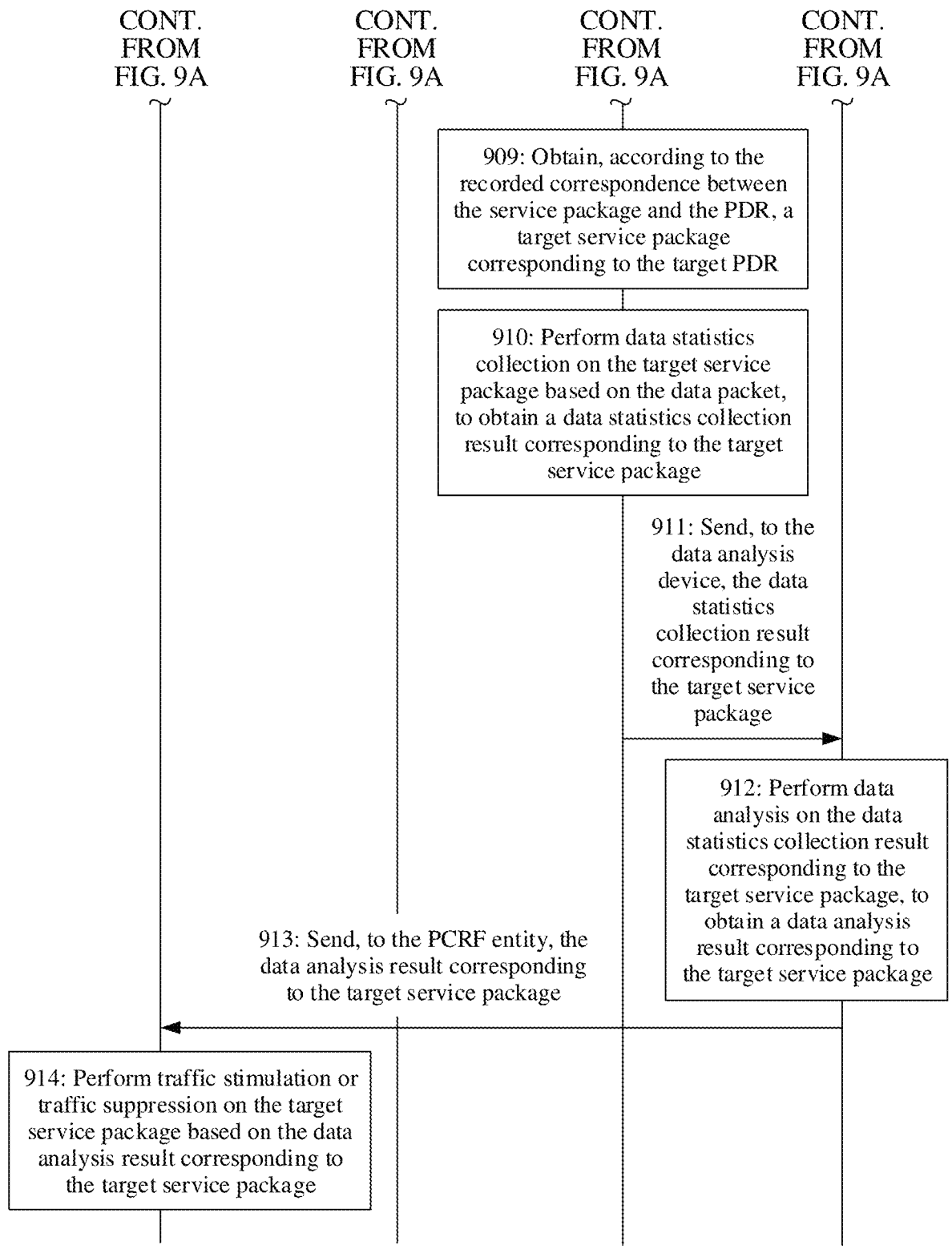
FIG. 9B is a schematic flowchart of a communication method according to an embodiment of this application.

The following further describes the communication method provided in this application based on the foregoing application scenario 2. FIG. 9A and FIG. 9B are a schematic flowchart of still another communication method according to an embodiment of this application. Step 901 to step 903, and step 914 are performed by the PCRF entity or a chip in the PCRF entity. Step 904 and step 905 are performed by the PGW-C entity or a chip in the PGW-C entity. Step 906 to step 911 are performed by the PGW-U entity or a chip in the PGW-U entity. Step 912 and step 913 are performed by a data analysis device or a chip in the data analysis device. The following uses an example in which the PCRF entity, the PGW-C entity, the PGW-U entity, and the data analysis device perform the method for description. As shown in FIG. 9A and FIG. 9B, the communication method includes the following step 901 to step 914.

901: The PCRF entity obtains a service package subscribed to by a subscriber.

Optionally, a user terminal may send a session establishment request to the PGW-C entity by using the RAN or a mobility management entity (MME). After receiving the session establishment request, the PGW-C entity sends a CCR-I (credit control request-initial) message to the PCRF entity. After receiving the CCR-I message, the PCRF entity is triggered to obtain the service package subscribed to by the subscriber. Alternatively, a user terminal may send a session update request to the PGW-C entity by using the RAN or an MME. After receiving the session update request, the PGW-C entity sends a CCR-U (credit control request-update) message to the PCRF entity. After receiving the CCR-U message, the PCRF entity is triggered to obtain the service package subscribed to by the subscriber. Alternatively, the PCRF entity may actively obtain the service package subscribed to by the subscriber. Alternatively, the PCRF entity may be triggered in another manner to obtain the service package subscribed to by the subscriber.

902: The PCRF entity determines a PCC rule corresponding to the service package.

For a specific implementation of step 902, refer to the specific implementation of step 602. Details are not described herein.

903: The PCRF entity sends, to the PGW-C entity, an identifier of the service package and the PCC rule corresponding to the service package.

In an optional implementation, the identifier of the service package is carried in an information element of a charging-rule-install charging-rule-install message and sent to the PGW-C entity. For example, information elements included in the charging-rule-install message may be shown as follows. An information element Service-Name/Service-Identifier indicates the identifier of the service package. Optionally, the identifier of the service package may be carried in an AVP of the charging-rule-install message. Based on this optional implementation, the PGW-C entity can accurately determine a correspondence between the service package and the PCC rule.

<Charging-Rule-Install>:=<AVP Header: AVP Code 1001, M-Bit set, V-Bit set, Vendor-ID 10415>
  *[Charging-Rule-Definition]
  *[Charging-Rule-Name]
  *[Charging-Rule-Base-Name]
  [Service-Name/Service-Identifier]
  [Bearer-Identifier]
  [Rule-Activation-Time]
  [Rule-Deactivation-Time]
  [Resource-Allocation-Notification]
  [Charging-Correlation-Indicator]
  *[AVP]

In an optional implementation, when the PCRF entity only sends an identifier of one service package, the identifier of the service package is carried in an information element of a credit control answer CCA message or an information element of a re-authentication request (RAR) and sent to the PGW-C entity. For example, information elements included in the CCA message may be shown as follows. An information element Service-Name/Service-Identifier indicates the identifier of the service package. Optionally, the identifier of the service package may be carried in an AVP of the corresponding CCA message or an AVP of the corresponding RAR message. Based on this optional implementation, the PGW-C entity can accurately determine a correspondence between the service package and the PCC rule.

<CCA>:=<Diameter Header: 272, PXY>
    <Session-Id>
    {Auth-Application-Id}
    {Origin-Host}
    {Origin-Realm}
    [Result-Code]
    [Experimental-Result]
    {CC-Request-Type}
    {CC-Request-Number}
    [CC-Session-Failover]
    [Bearer-Control-Mode]
    [Bearer-Usage]
    *[Event-Trigger]
    [Event-Report-Indication]
    [Origin-State-Id]
    [Service-Name/Service-Identifier]
    *[Charging-Rule-Remove]
    *[Charging-Rule-Install]

904: The PGW-C entity converts the PCC rule corresponding to the service package into a PDR.

Specifically, after receiving the identifier of the service package and the PCC rule corresponding to the service package, the PGW-C entity converts the PCC rule corresponding to the service package into the PDR.

905: The PGW-C entity sends, to the PGW-U entity, the identifier of the service package and the PDR corresponding to the service package.

In an optional implementation, the identifier of the service package is carried in an information element of the PDR corresponding to the service package and sent to the PGW-U entity. For example, the PDR may include an information element carrying a PDR identifier, an information element carrying a FAR ID, an information element carrying a URR ID, an information element carrying a QER ID, the information element carrying the identifier of the service package, and the like. Based on this optional implementation, the PGW-U entity can accurately determine a correspondence between the service package and the PDR.

In an optional implementation, the PGW-C entity only sends an identifier of one service package. The identifier of the service package is carried in an information element of the session establishment request and sent to the PGW-U entity. For example, the session establishment request may include the information element carrying the PDR, an information element carrying a node identifier (Node ID), the information element carrying the identifier of the service package, and the like. Based on this optional implementation, the PGW-U entity can accurately determine a correspondence between the service package and the PDR.

906: The PGW-U entity records the correspondence between the service package and the PDR.

After the PGW-U entity receives, from the PGW-C entity, the identifier of the service package and the PDR corresponding to the service package, the PGW-U entity records the correspondence between the service package and the PDR.

907: The PGW-U entity receives a data packet.

908: The PGW-U entity determines a target PDR matching the data packet.

909: The PGW-U entity obtains, according to the recorded correspondence between the service package and the PDR, a target service package corresponding to the target PDR.

For specific implementations of step 906 to step 909, refer to the specific implementations of step 606 to step 609. Details are not described herein.

910: The PGW-U entity performs data statistics collection on the target service package based on the data packet, to obtain a data statistics collection result corresponding to the target service package.

911: The PGW-U entity sends, to the data analysis device, the data statistics collection result corresponding to the target service package.

912: The data analysis device performs data analysis on the data statistics collection result corresponding to the target service package, to obtain a data analysis result corresponding to the target service package.

913: The data analysis device sends, to the PCRF entity, the data analysis result corresponding to the target service package.

914: The PCRF entity performs traffic stimulation or traffic suppression on the target service package based on the data analysis result corresponding to the target service package.

For specific implementations of step 910 to step 914, refer to the specific implementations of step 710 to step 714. Details are not described herein.

In an optional implementation, step 913 and step 914 may not be performed. After the data analysis device performs data analysis on the data statistics collection result corresponding to the target service package, and obtains the data analysis result corresponding to the target service package, the data analysis device may send, to the PGW-C entity, the data analysis result corresponding to the target service package. After receiving, from the data analysis device, the data analysis result corresponding to the target service package, the PGW-C entity performs traffic stimulation or traffic suppression on the target service package based on the data analysis result corresponding to the target service package.

In an optional implementation, step 913 and step 914 may not be performed. After the data analysis device performs data analysis on the data statistics collection result corresponding to the target service package, and obtains the data analysis result corresponding to the target service package, the data analysis device may send, to the PGW-U entity, the data analysis result corresponding to the target service package. After receiving, from the data analysis device, the data analysis result corresponding to the target service package, the PGW-U entity performs traffic stimulation or traffic suppression on the target service package based on the data analysis result corresponding to the target service package.

Figure 10A:
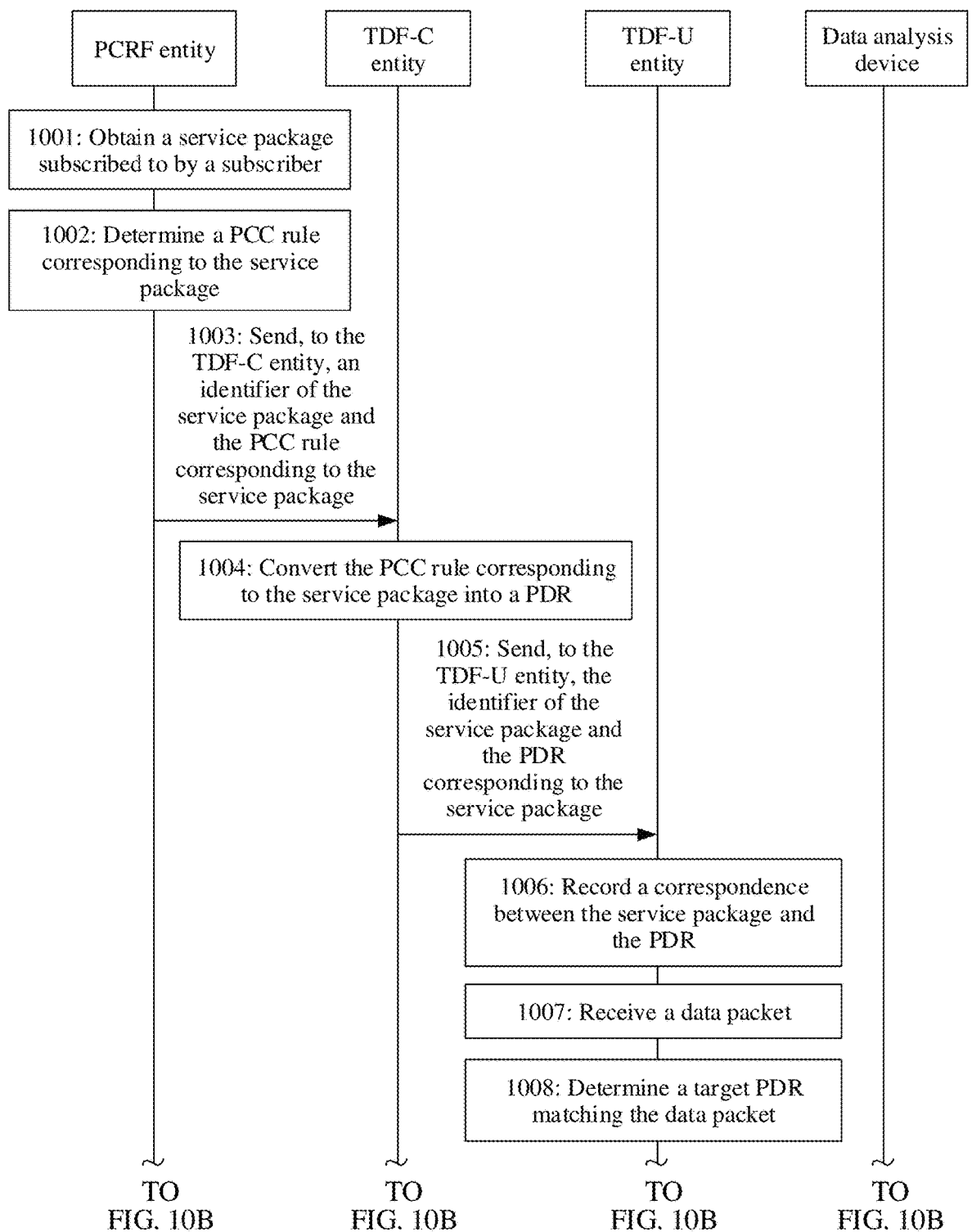
FIG. 10A is a schematic flowchart of a communication method according to an embodiment of this application.
Figure 10B:
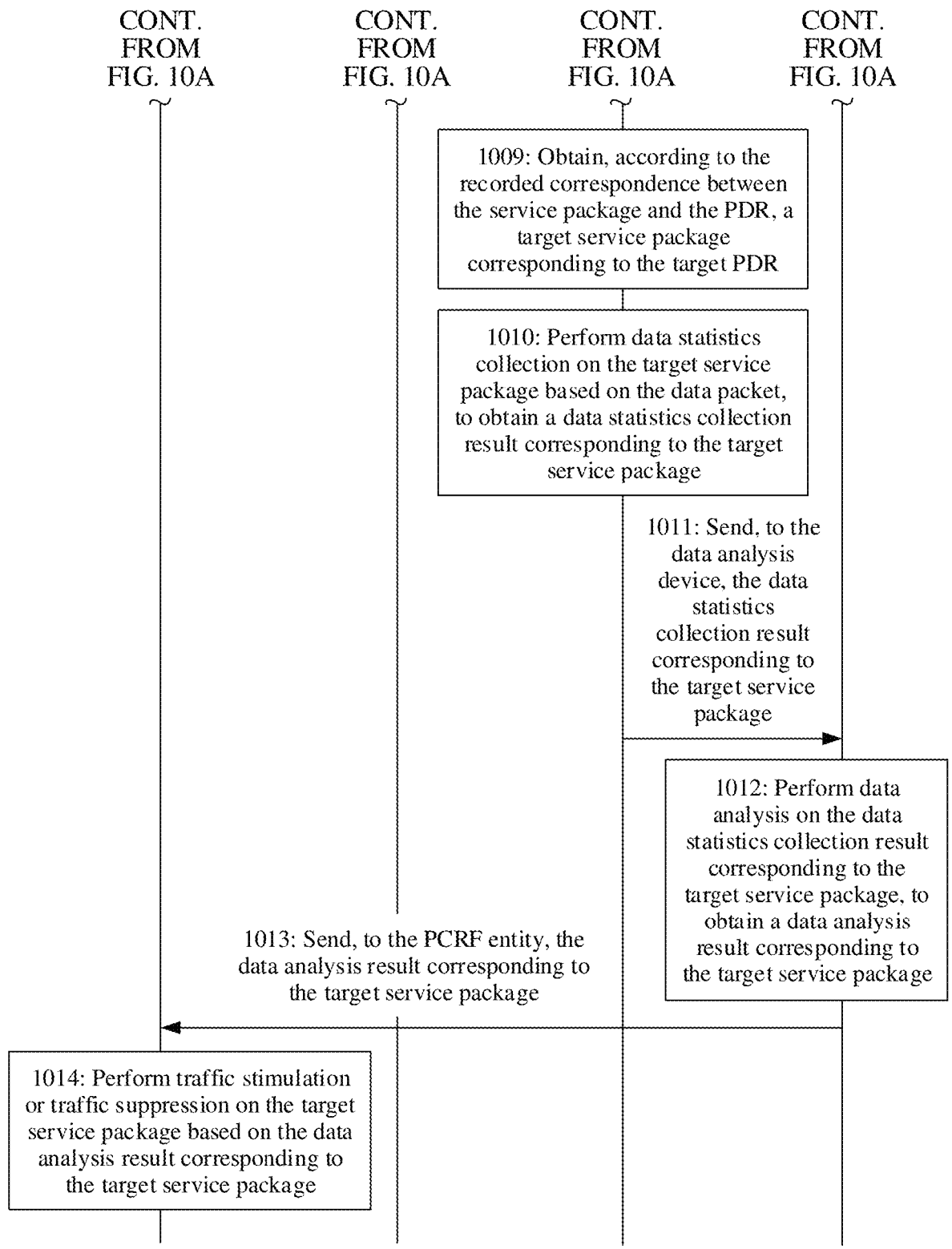
FIG. 10B is a schematic flowchart of a communication method according to an embodiment of this application.

The following further describes the communication method provided in this application based on the foregoing application scenario 3. FIG. 10A and FIG. 10B are a schematic flowchart of still another communication method according to an embodiment of this application. Step 1001 to step 1003, and step 1014 are performed by the PCRF entity or a chip in the PCRF entity. Step 1004 and step 1005 are performed by the TDF-C entity or a chip in the TDF-C entity. Step 1006 to step 1011 are performed by the TDF-U entity or a chip in the TDF-U entity. Step 1012 and step 1013 are performed by a data analysis device or a chip in the data analysis device. The following uses an example in which the PCRF entity, the TDF-C entity, the TDF-U entity, and the data analysis device perform the method for description. As shown in FIG. 10A and FIG. 10B, the communication method includes the following step 1001 to step 1014.

1001: The PCRF entity obtains a service package subscribed to by a subscriber.

Optionally, a user terminal may send a session establishment request to the TDF-C entity by using the RAN or a mobility management entity (MME). After receiving the session establishment request, the TDF-C entity sends a CCR-I (credit control request-initial) message to the PCRF entity. After receiving the CCR-I message, the PCRF entity is triggered to obtain the service package subscribed to by the subscriber. Alternatively, a user terminal may send a session update request to the PGW-C entity by using the RAN or an MME. After receiving the session update request, the TDF-C entity sends a CCR-U (credit control request-update) message to the PCRF entity. After receiving the CCR-U message, the PCRF entity is triggered to obtain the service package subscribed to by the subscriber. Alternatively, the PCRF entity may actively obtain the service package subscribed to by the subscriber. Alternatively, the PCRF entity may be triggered in another manner to obtain the service package subscribed to by the subscriber.

1002: The PCRF entity determines a PCC rule corresponding to the service package.

For a specific implementation of step 1002, refer to the specific implementation of step 602. Details are not described herein.

1003: The PCRF entity sends, to the TDF-C entity, an identifier of the service package and the PCC rule corresponding to the service package.

In an optional implementation, the identifier of the service package is carried in an information element of a charging-rule-install charging-rule-install message and sent to the TDF-C entity. Optionally, the identifier of the service package may be carried in an AVP of the charging-rule-install message. Based on this optional implementation, the TDF-C entity can accurately determine a correspondence between the service package and the PCC rule.

In an optional implementation, when the PCRF entity only sends an identifier of one service package, the identifier of the service package is carried in an information element of a credit control answer CCA message or an information element of a re-authentication request (RAR) and sent to the TDF-C entity. Optionally, the identifier of the service package may be carried in an AVP of the corresponding CCA message or an AVP of the corresponding RAR message. Based on this optional implementation, the TDF-C entity can accurately determine a correspondence between the service package and the PCC rule.

1004: The TDF-C entity converts the PCC rule corresponding to the service package into a PDR.

After receiving the identifier of the service package and the PCC rule corresponding to the service package, the TDF-C entity converts the PCC rule corresponding to the service package into the PDR.

1005: The TDF-C entity sends, to the TDF-U entity, the identifier of the service package and the PDR corresponding to the service package.

In an optional implementation, the identifier of the service package is carried in an information element of the PDR corresponding to the service package and sent to the TDF-U entity. For example, the PDR may include an information element carrying a PDR identifier, an information element carrying a FAR ID, an information element carrying a URR ID, an information element carrying a QER ID, the information element carrying the identifier of the service package, and the like. Based on this optional implementation, the TDF-U entity can accurately determine a correspondence between the service package and the PDR.

In an optional implementation, the TDF-C entity only sends an identifier of one service package. The identifier of the service package is carried in an information element of the session establishment request and sent to the TDF-U entity. For example, the session establishment request may include the information element carrying the PDR, an information element carrying a node identifier (Node ID), the information element carrying the identifier of the service package, and the like. Based on this optional implementation, the TDF-U entity can accurately determine a correspondence between the service package and the PDR.

1006: The TDF-U entity records the correspondence between the service package and the PDR.

1007: The TDF-U entity receives a data packet.

1008: The TDF-U entity determines a target PDR matching the data packet.

1009: The TDF-U entity obtains, according to the recorded correspondence between the service package and the PDR, a target service package corresponding to the target PDR.

For specific implementations of step 1006 to step 1009, refer to the specific implementations of step 606 to step 609. Details are not described herein.

1010: The TDF-U entity performs data statistics collection on the target service package based on the data packet, to obtain a data statistics collection result corresponding to the target service package.

1011: The TDF-U entity sends, to the data analysis device, the data statistics collection result corresponding to the target service package.

1012: The data analysis device performs data analysis on the data statistics collection result corresponding to the target service package, to obtain a data analysis result corresponding to the target service package.

1013: The data analysis device sends, to the PCRF entity, the data analysis result corresponding to the target service package.

1014: The PCRF entity performs traffic stimulation or traffic suppression on the target service package based on the data analysis result corresponding to the target service package.

For specific implementations of step 1010 to step 1014, refer to the specific implementations of step 710 to step 714. Details are not described herein.

In an optional implementation, step 1013 and step 1014 may not be performed. After the data analysis device performs data analysis on the data statistics collection result corresponding to the target service package, and obtains the data analysis result corresponding to the target service package, the data analysis device may send, to the TDF-C entity, the data analysis result corresponding to the target service package. After receiving, from the data analysis device, the data analysis result corresponding to the target service package, the TDF-C entity performs traffic stimulation or traffic suppression on the target service package based on the data analysis result corresponding to the target service package.

In an optional implementation, step 1013 and step 1014 may not be performed. After the data analysis device performs data analysis on the data statistics collection result corresponding to the target service package, and obtains the data analysis result corresponding to the target service package, the data analysis device may send, to the TDF-U entity, the data analysis result corresponding to the target service package. After receiving, from the data analysis device, the data analysis result corresponding to the target service package, the TDF-U entity performs traffic stimulation or traffic suppression on the target service package based on the data analysis result corresponding to the target service package.

Figure 11:
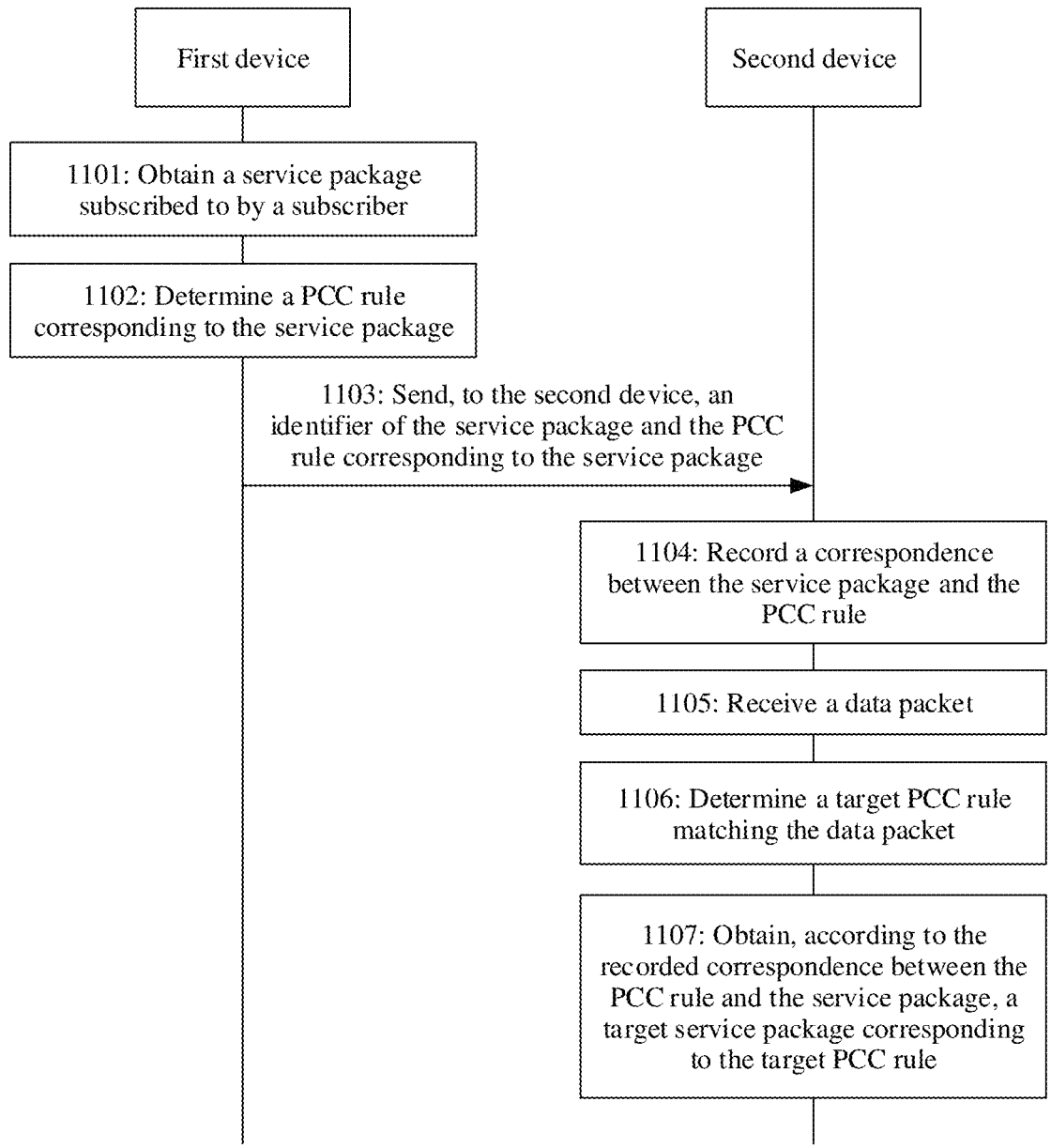
FIG. 11 is a schematic flowchart of a communication method according to an embodiment of this application.

Based on the communication system described in FIG. 5, FIG. 11 is a schematic flowchart of still another communication method according to an embodiment of this application. Step 1101 to step 1103 are performed by the first device or a chip in the first device. Step 1104 to step 1107 are performed by the second device or a chip in the second device. The following uses an example in which the first device and the second device perform the method for description. As shown in FIG. 11, the communication method includes the following step 1101 to step 1107.

1101: The first device obtains a service package subscribed to by a subscriber.

The communication method shown in FIG. 11 may be applied to any one of the foregoing application scenario 4 and application scenario 5. In other words, in FIG. 11, the first device is the PCRF entity, and the second device is the PGW. Alternatively, the first device is the PCRF entity, and the second device is the TDF entity. Certainly, the first device may alternatively be another entity configured to deliver a PCC rule. The second device may alternatively be another entity configured to execute the PCC rule. This is not limited in this embodiment of this application.

1102: The first device determines a PCC rule corresponding to the service package.

1103: The first device sends, to the second device, an identifier of the service package and the PCC rule corresponding to the service package.

Specific implementations of step 1101 to step 1103 are the same as the specific implementations of step 601 to step 603. Details are not described herein.

1104: The second device records a correspondence between the service package and the PCC rule.

After receiving, from the first device, the identifier of the service package and the PCC rule corresponding to the service package, the second device records the correspondence between the service package and the PCC rule.

1105: The second device receives a data packet.

The data packet may be an uplink data packet or a downlink data packet.

1106: The second device determines a target PCC rule matching the data packet.

In this embodiment of this application, after receiving the data packet, the second device determines the target PCC rule matching the data packet.

The second device matches attribute information of the data packet with traffic data flow detection information in the PCC rule. If the matching succeeds, it is determined that the data packet matches the PCC rule. For example, a PCC rule 1 and a PCC rule 2 of a subscriber 1 are activated in the second device. The PCC rule 1 corresponds to a service package 1, and the PCC rule 2 corresponds to a service package 2. After receiving a data packet accessed by the subscriber 1, the second device matches attribute information of the data packet with traffic data flow detection information in the PCC rule 1 and traffic data flow detection information in the PCC rule 2. If the attribute information of the data packet matches the traffic data flow detection information in the PCC rule 1, the data packet matches the PCC rule 1. Therefore, the PCC rule 1 is the target PCC rule. The second device determines, according to the pre-recorded correspondence between the service package and the PCC rule, that the PCC rule 1 corresponds to the service package 1.

1107: The second device obtains, according to the recorded correspondence between the PCC rule and the service package, a target service package corresponding to the target PCC rule.

The obtained target service package is a service package to which the data packet received by the second device belongs. It can be learned that, by implementing the method described in FIG. 11, a core network device can determine the service package to which the received data packet belongs.

After obtaining the target service package corresponding to the target PCC rule, the second device can perform a related operation based on the service package.

The following describes a process of the related operation that can be performed by the second device based on the service package.

Figure 12A:
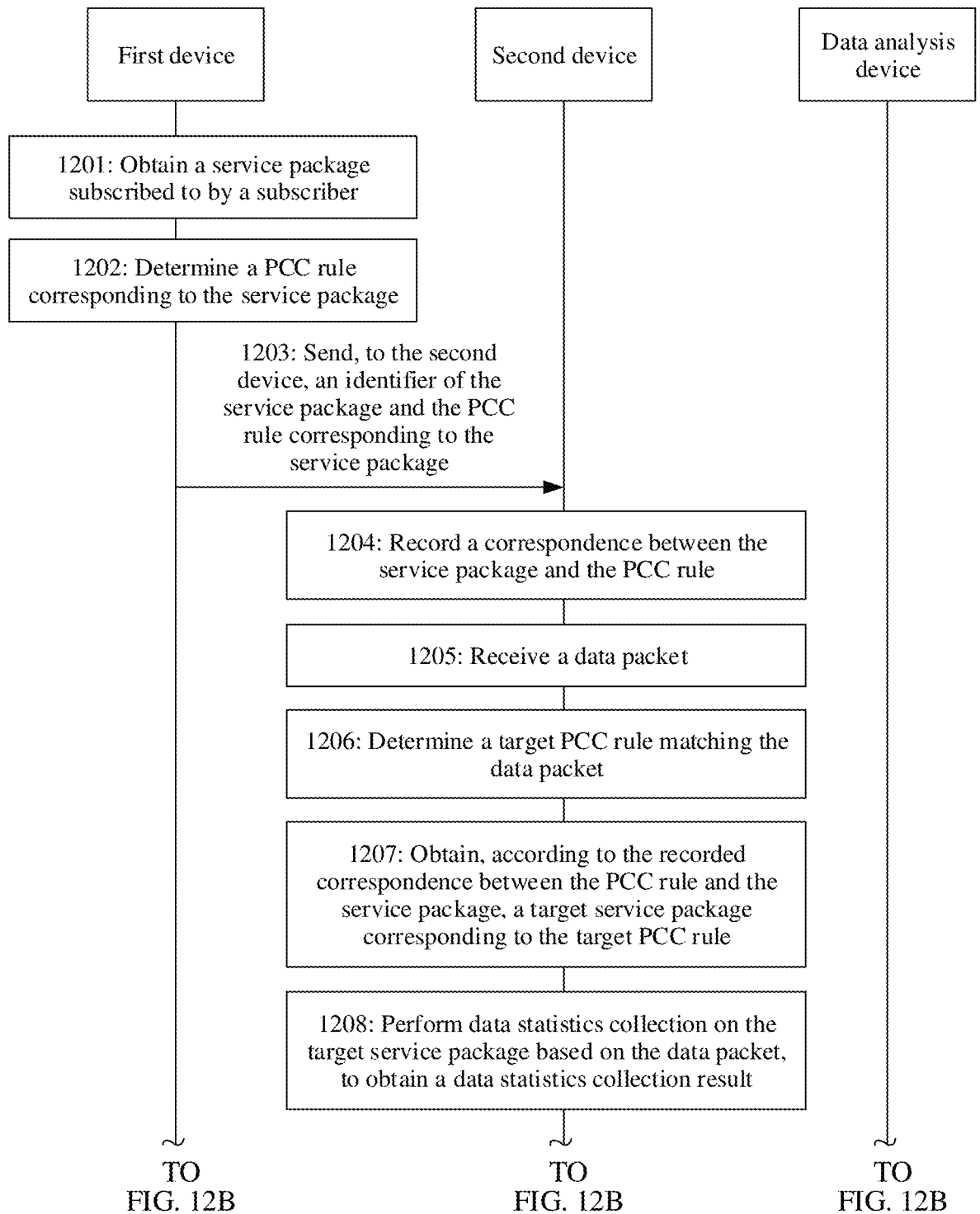
FIG. 12A is a schematic flowchart of a communication method according to an embodiment of this application.
Figure 12B:
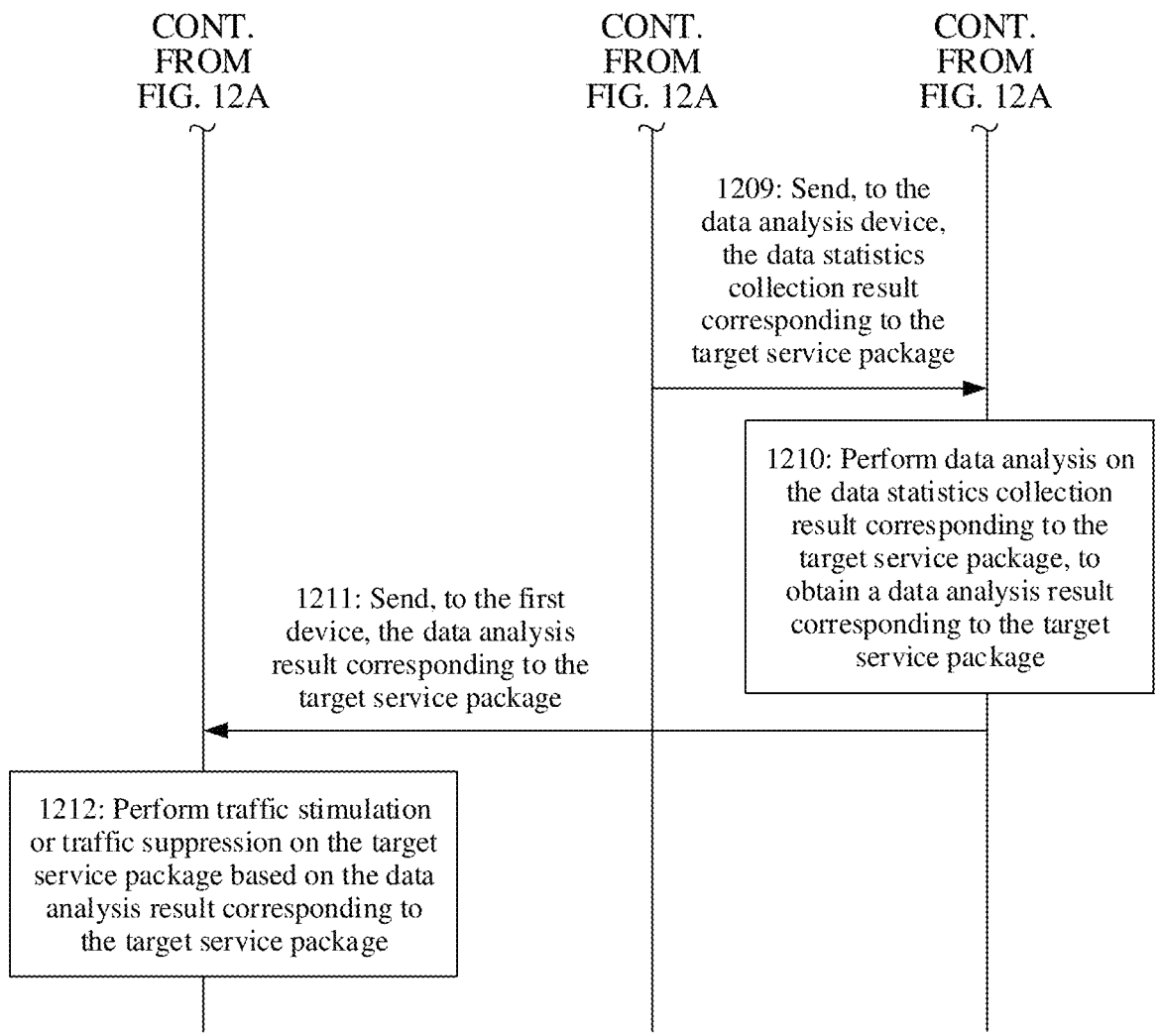
FIG. 12B is a schematic flowchart of a communication method according to an embodiment of this application.

FIG. 12A and FIG. 12B are a schematic flowchart of still another communication method according to an embodiment of this application. Specific implementations of step 1201 to step 1207 are the same as the specific implementations of step 1101 to step 1107. Details are not described herein. As shown in FIG. 12A and FIG. 12B, after obtaining the target service package corresponding to the target PCC rule, the second device may further perform the following step 1208 to step 1212.

1208: The second device performs data statistics collection on the target service package based on the data packet, to obtain a data statistics collection result.

For example, the target PCC rule is the PCC rule 1, and the target service package corresponding to the target PCC rule 1 is the service package 1. The second device performs data statistics collection on the service package 1 based on the data packet, to obtain the data statistics collection result. Optionally, the second device may further execute a charging and control policy defined in the PCC rule 1.

Certainly, the second device may not perform step 1208, and the second device may perform another operation based on the target service package. This is not limited in this embodiment of this application.

1209: The second device sends, to a data analysis device, the data statistics collection result corresponding to the target service package.

1210: The data analysis device performs data analysis on the data statistics collection result corresponding to the target service package, to obtain a data analysis result corresponding to the target service package.

1211: The data analysis device sends, to the first device, the data analysis result corresponding to the target service package.

1212: The first device performs traffic stimulation or traffic suppression on the target service package based on the data analysis result corresponding to the target service package.

Specific implementations of step 1208 to step 1212 are the same as the specific implementations of step 710 to step 714. Details are not described herein.

In an optional implementation, step 1211 and step 1212 may not be performed. After the data analysis device performs data analysis on the data statistics collection result corresponding to the target service package, and obtains the data analysis result corresponding to the target service package, the data analysis device may send, to the second device, the data analysis result corresponding to the target service package. After receiving, from the data analysis device, the data analysis result corresponding to the target service package, the second device performs traffic stimulation or traffic suppression on the target service package based on the data analysis result corresponding to the target service package. Optionally, if the target service package is a high-value service package, the second device may perform traffic stimulation on the target service package based on the data analysis result corresponding to the target service package. If the target service package is a low-value service package, the second device may perform traffic suppression on the target service package based on the data analysis result corresponding to the target service package. The second device may generate an overlay rule for the target service package. The overlay rule may be used to perform traffic stimulation or traffic suppression on the target service package.

Figure 13A:
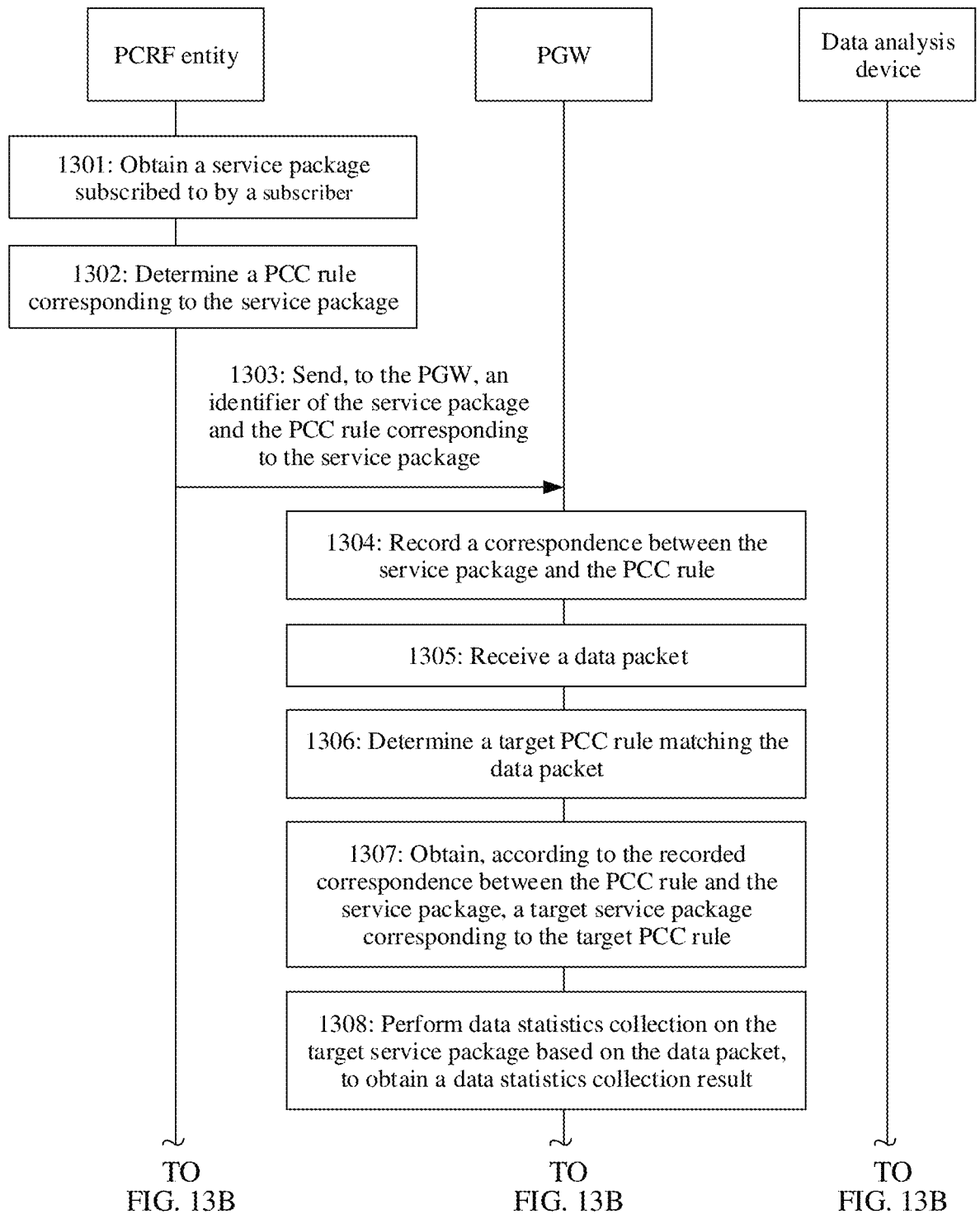
FIG. 13A is a schematic flowchart of a communication method according to an embodiment of this application.
Figure 13B:
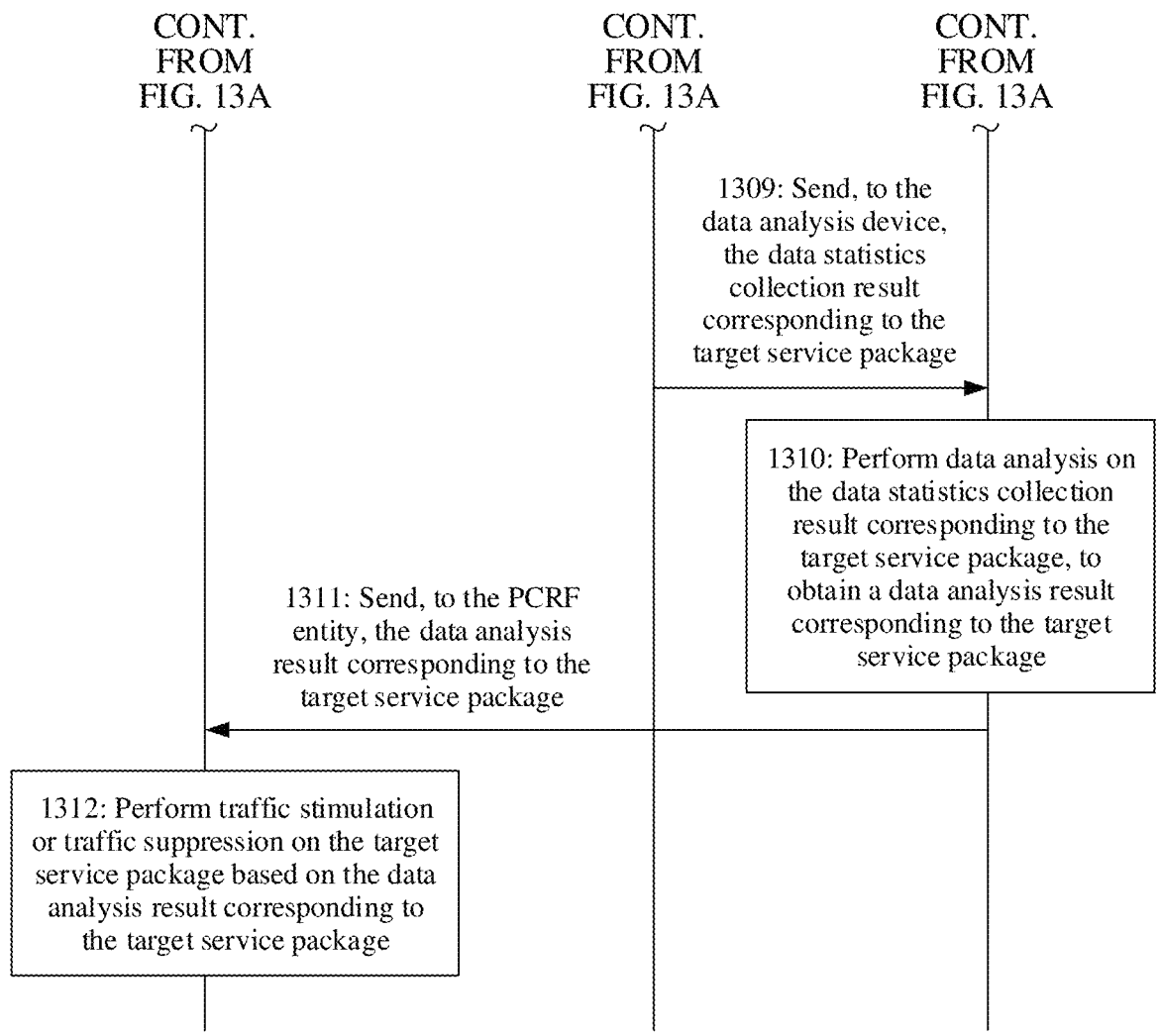
FIG. 13B is a schematic flowchart of a communication method according to an embodiment of this application.

The following further describes the communication method provided in this application based on the foregoing application scenario 4. FIG. 13A and FIG. 13B are a schematic flowchart of still another communication method according to an embodiment of this application. Step 1301 to step 1303, and step 1312 are performed by the PCRF entity or a chip in the PCRF entity. Step 1304 to step 1309 are performed by the PGW or a chip in the PGW. Step 1310 and step 1311 are performed by a data analysis device or a chip in the data analysis device. The following uses an example in which the PCRF entity, the PGW, and the data analysis device perform the method for description. As shown in FIG. 13A and FIG. 13B, the communication method includes the following step 1301 to step 1312.

1301: The PCRF entity obtains a service package subscribed to by a subscriber.

Optionally, a user terminal may send a session establishment request to the PGW by using the RAN or a mobility management entity (MME). After receiving the session establishment request, the PGW sends a CCR-I (credit control request-initial) message to the PCRF entity. After receiving the CCR-I message, the PCRF entity is triggered to obtain the service package subscribed to by the subscriber. Alternatively, a user terminal may send a session update request to the PGW by using the RAN or an MME. After receiving the session update request, the PGW sends a CCR-U (credit control request-update) message to the PCRF entity. After receiving the CCR-U message, the PCRF entity is triggered to obtain the service package subscribed to by the subscriber. Alternatively, the PCRF entity may actively obtain the service package subscribed to by the subscriber. Alternatively, the PCRF entity may be triggered in another manner to obtain the service package subscribed to by the subscriber.

1302: The PCRF entity determines a PCC rule corresponding to the service package.

For a specific implementation of step 1302, refer to the specific implementation of step 602. Details are not described herein.

1303: The PCRF entity sends, to the PGW, an identifier of the service package and the PCC rule corresponding to the service package.

In an optional implementation, the identifier of the service package is carried in an information element of a charging-rule-install charging-rule-install message and sent to the PGW. Optionally, the identifier of the service package may be carried in an AVP of the charging-rule-install message. Based on this optional implementation, the PGW can accurately determine a correspondence between the service package and the PCC rule.

In an optional implementation, when the PCRF entity only sends an identifier of one service package, the identifier of the service package is carried in an information element of a credit control answer CCA message or an information element of a re-authentication request (RAR) message and sent to the PGW. Optionally, the identifier of the service package may be carried in an AVP of the corresponding CCA message or an AVP of the corresponding RAR message. Based on this optional implementation, the PGW can accurately determine a correspondence between the service package and the PCC rule.

1304: The PGW records the correspondence between the service package and the PCC rule.

In this embodiment of this application, after receiving the identifier of the service package and the PCC rule corresponding to the service package, the PGW records the correspondence between the service package and the PCC rule.

1305: The PGW receives a data packet.

The data packet may be an uplink data packet or a downlink data packet.

1306: The PGW determines a target PCC rule matching the data packet.

1307: The PGW obtains, according to the recorded correspondence between the PCC rule and the service package, a target service package corresponding to the target PCC rule.

Specific implementations of step 1305 to step 1307 are the same as the specific implementations of step 1105 to step 1107. Details are not described herein.

1308: The PGW performs data statistics collection on the target service package based on the data packet, to obtain a data statistics collection result.

1309: The PGW sends, to the data analysis device, the data statistics collection result corresponding to the target service package.

1310: The data analysis device performs data analysis on the data statistics collection result corresponding to the target service package, to obtain a data analysis result corresponding to the target service package.

1311: The data analysis device sends, to the PCRF entity, the data analysis result corresponding to the target service package.

1312: The PCRF entity performs traffic stimulation or traffic suppression on the target service package based on the data analysis result corresponding to the target service package.

Specific implementations of step 1308 to step 1312 are the same as the specific implementations of step 710 to step 714. Details are not described herein.

In an optional implementation, step 1311 and step 1312 may not be performed. After the data analysis device performs data analysis on the data statistics collection result corresponding to the target service package, and obtains the data analysis result corresponding to the target service package, the data analysis device may send, to the PGW, the data analysis result corresponding to the target service package. After receiving, from the data analysis device, the data analysis result corresponding to the target service package, the PGW performs traffic stimulation or traffic suppression on the target service package based on the data analysis result corresponding to the target service package. Optionally, if the target service package is a high-value service package, the PGW may perform traffic stimulation on the target service package based on the data analysis result corresponding to the target service package. If the target service package is a low-value service package, the PGW may perform traffic suppression on the target service package based on the data analysis result corresponding to the target service package. The PGW may generate an overlay rule for the target service package. The overlay rule may be used to perform traffic stimulation or traffic suppression on the target service package.

Figure 14A:
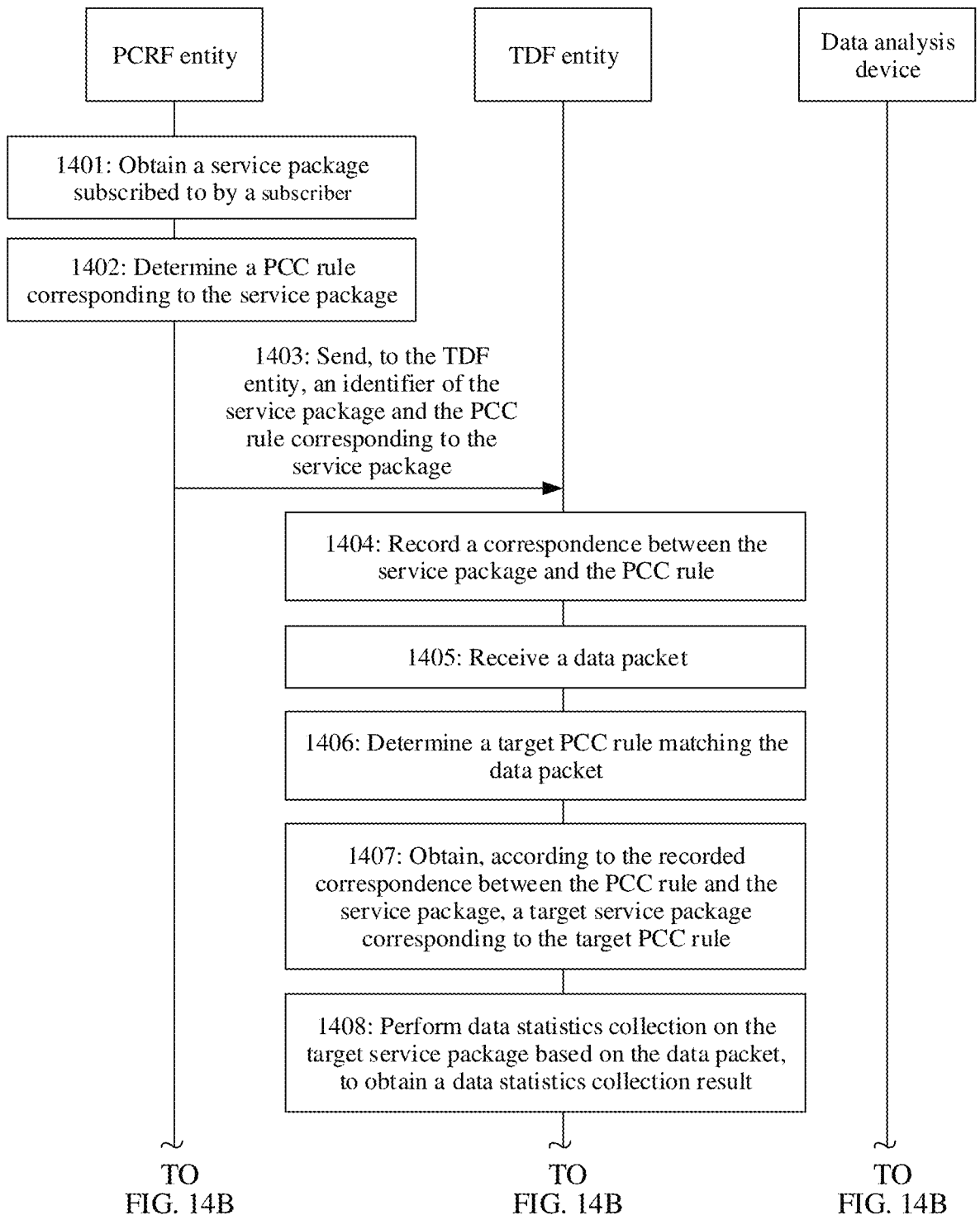
FIG. 14A is a schematic flowchart of a communication method according to an embodiment of this application.
Figure 14B:
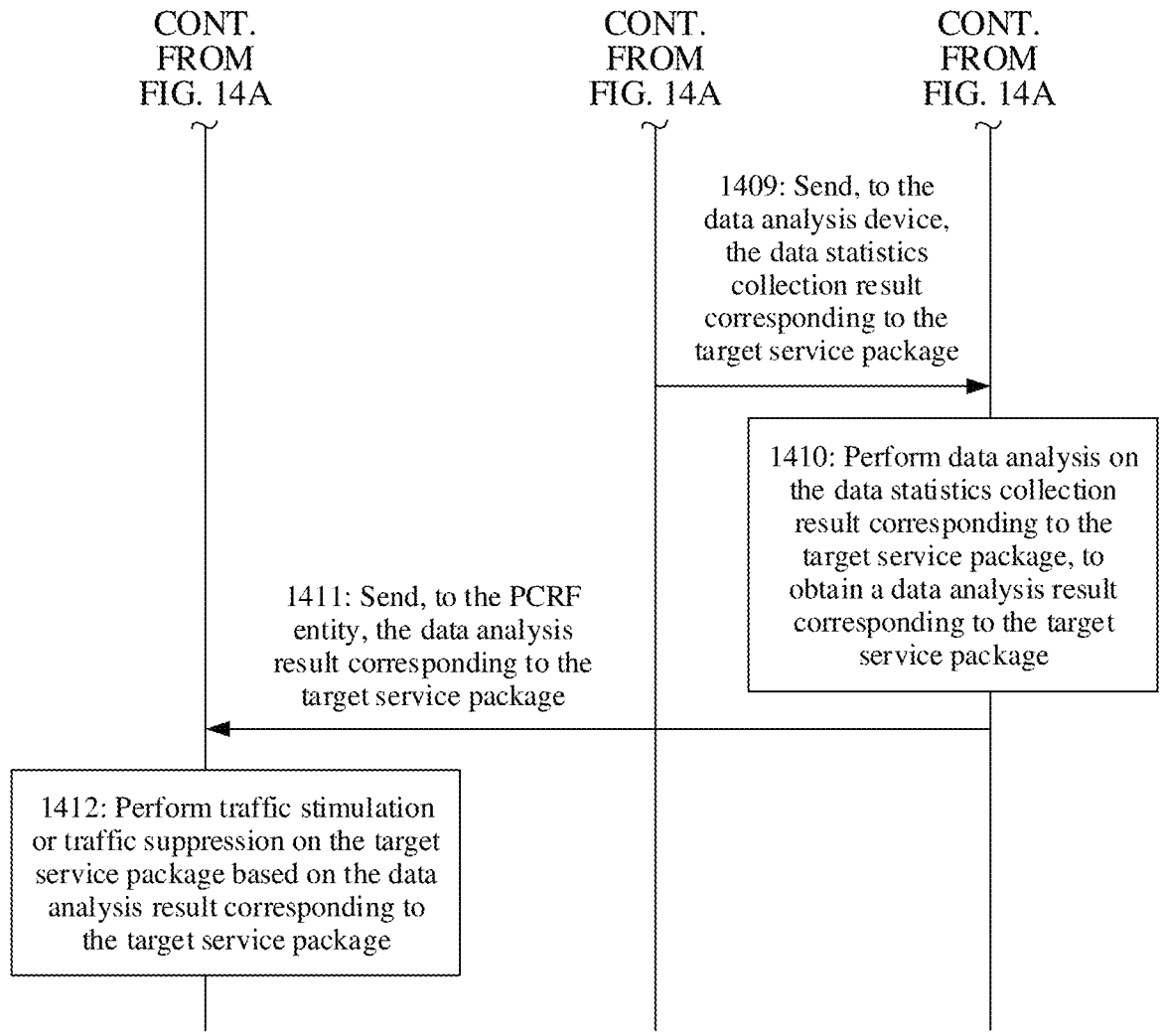
FIG. 14B is a schematic flowchart of a communication method according to an embodiment of this application.

The following further describes the communication method provided in this application based on the foregoing application scenario 5. FIG. 14A and FIG. 14B are a schematic flowchart of still another communication method according to an embodiment of this application. Step 1401 to step 1403, and step 1412 are performed by the PCRF entity or a chip in the PCRF entity. Step 1404 to step 1409 are performed by the TDF entity or a chip in the TDF entity. Step 1410 and step 1411 are performed by a data analysis device or a chip in the data analysis device. The following uses an example in which the PCRF entity, the TDF entity, and the data analysis device perform the method for description. As shown in FIG. 14A and FIG. 14B, the communication method includes the following step 1401 to step 1412.

1401: The PCRF entity obtains a service package subscribed to by a subscriber.

Optionally, a user terminal may send a session establishment request to the TDF entity by using the RAN or a mobility management entity (MME). After receiving the session establishment request, the TDF entity sends a CCR-I (credit control request-initial) message to the PCRF entity. After receiving the CCR-I message, the PCRF entity is triggered to obtain the service package subscribed to by the subscriber. Alternatively, a user terminal may send a session update request to the TDF entity by using the RAN or the MME. After receiving the session update request, the TDF entity sends a CCR-U (credit control request-update) message to the PCRF entity. After receiving the CCR-U message, the PCRF entity is triggered to obtain the service package subscribed to by the subscriber. Alternatively, the PCRF entity may actively obtain the service package subscribed to by the subscriber. Alternatively, the PCRF entity may be triggered in another manner to obtain the service package subscribed to by the subscriber.

1402: The PCRF entity determines a PCC rule corresponding to the service package.

For a specific implementation of step 1402, refer to the specific implementation of step 602. Details are not described herein.

1403: The PCRF entity sends, to the TDF entity, an identifier of the service package and the PCC rule corresponding to the service package.

In an optional implementation, the identifier of the service package is carried in an information element of a charging-rule-install charging-rule-install message and sent to the TDF entity. Optionally, the identifier of the service package may be carried in an AVP of the charging-rule-install message. Based on this optional implementation, the TDF entity can accurately determine a correspondence between the service package and the PCC rule.

In an optional implementation, when the PCRF entity only sends an identifier of one service package, the identifier of the service package is carried in an information element of a credit control answer CCA message or an information element of a re-authentication request (RAR) and sent to the TDF entity. Optionally, the identifier of the service package may be carried in an AVP of the corresponding CCA message or an AVP of the corresponding RAR message. Based on this optional implementation, the TDF entity can accurately determine a correspondence between the service package and the PCC rule.

1404: The TDF entity records the correspondence between the service package and the PCC rule.

In this embodiment of this application, after receiving the identifier of the service package and the PCC rule corresponding to the service package, the TDF entity records the correspondence between the service package and the PCC rule.

1405: The TDF entity receives a data packet.

The data packet may be an uplink data packet or a downlink data packet.

1406: The TDF entity determines a target PCC rule matching the data packet.

1407: The TDF entity obtains, according to the recorded correspondence between the PCC rule and the service package, a target service package corresponding to the target PCC rule.

Specific implementations of step 1405 to step 1407 are the same as the specific implementations of step 1105 to step 1107. Details are not described herein.

1408: The TDF entity performs data statistics collection on the target service package based on the data packet, to obtain a data statistics collection result.

1409: The TDF entity sends, to the data analysis device, the data statistics collection result corresponding to the target service package.

1410: The data analysis device performs data analysis on the data statistics collection result corresponding to the target service package, to obtain a data analysis result corresponding to the target service package.

1411: The data analysis device sends, to the PCRF entity, the data analysis result corresponding to the target service package.

1412: The PCRF entity performs traffic stimulation or traffic suppression on the target service package based on the data analysis result corresponding to the target service package.

Specific implementations of step 1408 to step 1412 are the same as the specific implementations of step 710 to step 714. Details are not described herein.

In an optional implementation, step 1411 and step 1412 may not be performed. After the data analysis device performs data analysis on the data statistics collection result corresponding to the target service package, and obtains the data analysis result corresponding to the target service package, the data analysis device may send, to the TDF entity, the data analysis result corresponding to the target service package. After receiving, from the data analysis device, the data analysis result corresponding to the target service package, the TDF entity performs traffic stimulation or traffic suppression on the target service package based on the data analysis result corresponding to the target service package. Optionally, if the target service package is a high-value service package, the TDF entity may perform traffic stimulation on the target service package based on the data analysis result corresponding to the target service package. If the target service package is a low-value service package, the TDF entity may perform traffic suppression on the target service package based on the data analysis result corresponding to the target service package. The TDF entity may generate an overlay rule for the target service package. The overlay rule may be used to perform traffic stimulation or traffic suppression on the target service package.

Figure 15A:
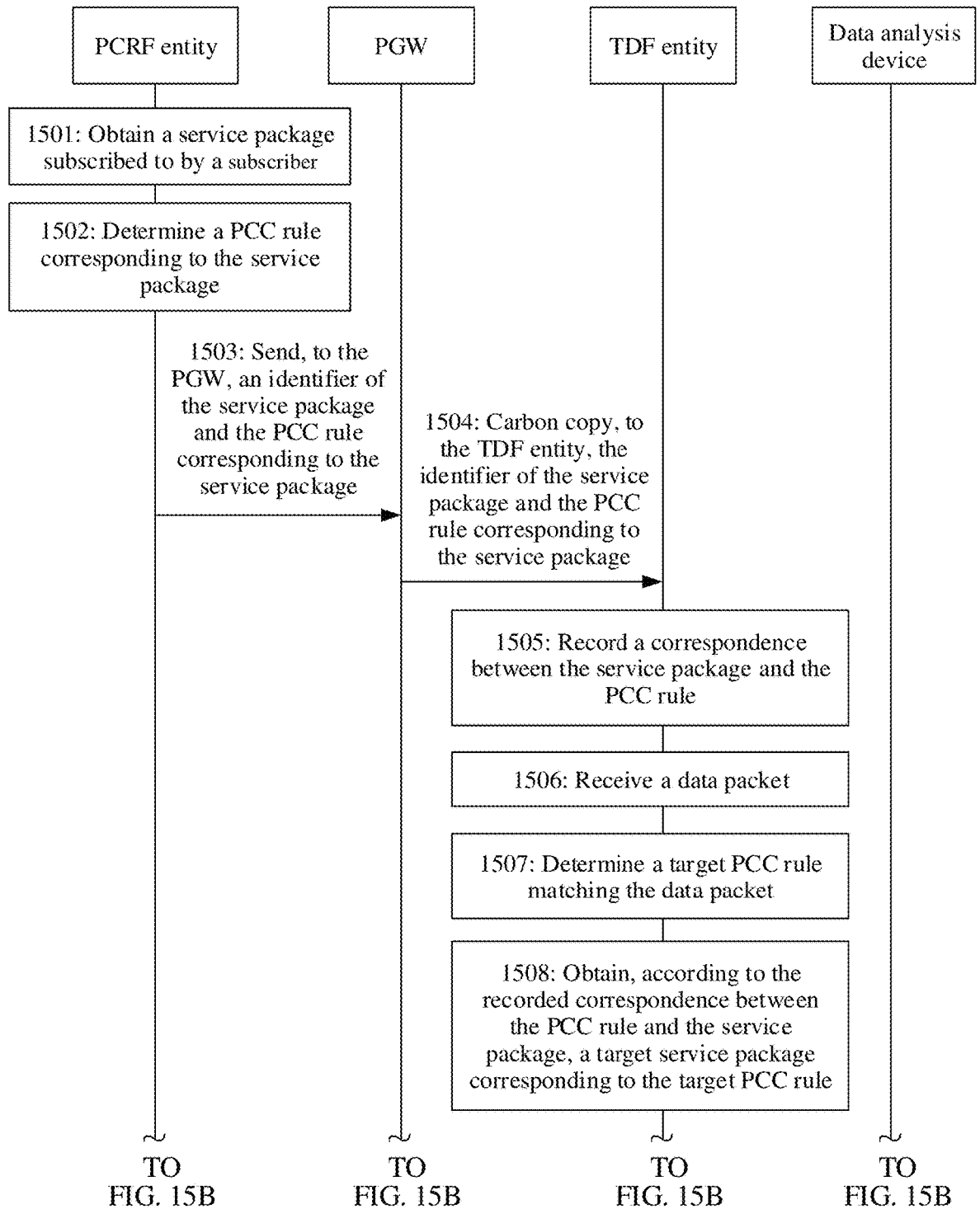
FIG. 15A is a schematic flowchart of a communication method according to an embodiment of this application.
Figure 15B:
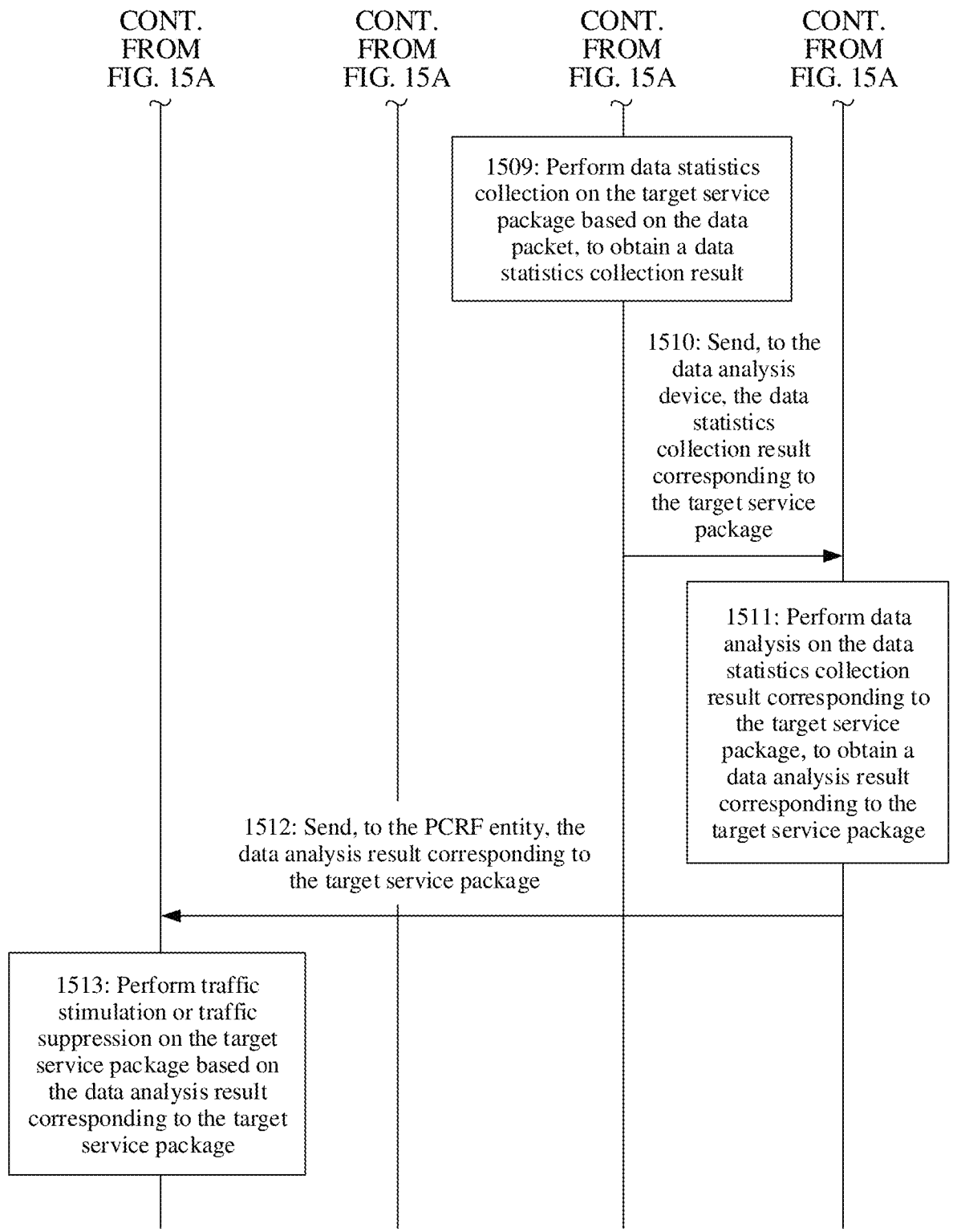
FIG. 15B is a schematic flowchart of a communication method according to an embodiment of this application.

FIG. 15A and FIG. 15B are a schematic flowchart of still another communication method according to an embodiment of this application. Step 1501 to step 1503, and step 1512 are performed by the PCRF entity or a chip in the PCRF entity. Step 1504 to step 1509 are performed by the PGW or a chip in the PGW. Step 1510 and step 1511 are performed by a data analysis device or a chip in the data analysis device. The following uses an example in which the PCRF entity, the PGW, and the data analysis device perform the method for description. As shown in FIG. 15A and FIG. 15B, the communication method includes the following step 1501 to step 1512.

1501: The PCRF entity obtains a service package subscribed to by a subscriber.

1502: The PCRF entity determines a PCC rule corresponding to the service package.

1503: The PCRF entity sends, to the PGW, an identifier of the service package and the PCC rule corresponding to the service package.

Specific implementations of step 1501 to step 1503 are the same as the specific implementations of step 1401 to step 1403. Details are not described herein.

1504: The PGW carbon copies, to the TDF entity, the identifier of the service package and the PCC rule corresponding to the service package.

After receiving, from the PCRF entity, the identifier of the service package and the PCC rule corresponding to the service package, the PGW carbon copies, to the TDF entity, the identifier of the service package and the PCC rule corresponding to the service package. Optionally, the PGW sends, to the TDF by using a RADIUS carbon-copy interface, the identifier of the service package and the PCC rule corresponding to the service package. For example, the identifier of the service package and the PCC rule corresponding to the service package may be sent to the TDF by using an accounting start message or an accounting update message of the RADIUS carbon-copy interface. Optionally, if an identifier of one service package is sent only, the identifier of the service package and a PCC rule corresponding to the service package may alternatively be sent to the TDF entity by using session dimension information.

1505: The TDF entity records a correspondence between the service package and the PCC rule.

In this embodiment of this application, after receiving the identifier of the service package and the PCC rule corresponding to the service package, the TDF entity records the correspondence between the service package and the PCC rule.

1506: The TDF entity receives a data packet.

1507: The TDF entity determines a target PCC rule matching the data packet.

1508: The TDF entity obtains, according to the recorded correspondence between the PCC rule and the service package, a target service package corresponding to the target PCC rule.

1509: The TDF entity performs data statistics collection on the target service package based on the data packet, to obtain a data statistics collection result.

1510: The TDF entity sends, to the data analysis device, the data statistics collection result corresponding to the target service package.

1511: The data analysis device performs data analysis on the data statistics collection result corresponding to the target service package, to obtain a data analysis result corresponding to the target service package.

1512: The data analysis device sends, to the PCRF entity, the data analysis result corresponding to the target service package.

1513: The PCRF entity performs traffic stimulation or traffic suppression on the target service package based on the data analysis result corresponding to the target service package.

Specific implementations of step 1505 to step 1513 are the same as the specific implementations of step 1404 to step 1412. Details are not described herein.

In the embodiments of this application, the device may be divided into functional units based on the foregoing method example. For example, each functional unit may be obtained through division based on a corresponding function, or two or more functions may be integrated into one unit. The integrated unit may be implemented in a form of hardware, or may be implemented in a form of a software functional unit. It should be noted that, in the embodiments, division into the units is merely an example, and is merely a logical function division. In an actual implementation, another division manner may be used.

Figure 16:
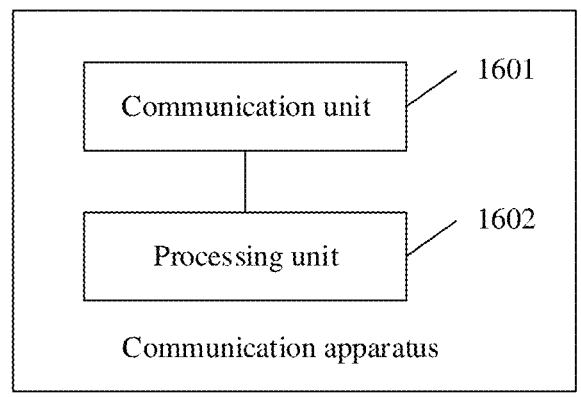
FIG. 16 is a schematic diagram of a structure of a communication apparatus according to an embodiment of this application.

FIG. 16 is a schematic diagram of a structure of a communication apparatus according to an embodiment of this application. The communication apparatus shown in FIG. 16 may be configured to perform some or all functions of the first device in the method embodiments described in FIG. 6, and FIG. 7A and FIG. 7B. Alternatively, the communication apparatus shown in FIG. 16 may be configured to perform some or all functions of the PCF entity in the method embodiment described in FIG. 8A and FIG. 8B. Alternatively, the communication apparatus shown in FIG. 16 may be configured to perform some or all functions of the PCRF entity in the method embodiments described in FIG. 9A and FIG. 9B, and FIG. 10A and FIG. 10B. Alternatively, the communication apparatus shown in FIG. 16 may be configured to perform some or all functions of the first device in the method embodiments described in FIG. 11, and FIG. 12A and FIG. 12B. Alternatively, the communication apparatus shown in FIG. 16 may be configured to perform some or all functions of the PCRF entity in the method embodiments described in FIG. 13A and FIG. 13B to FIG. 15A and FIG. 15B. The communication apparatus shown in FIG. 16 may include a communication unit 1601 and a processing unit 1602.

The processing unit 1602 is configured to obtain a service package subscribed to by a subscriber. The processing unit 1602 is further configured to determine a policy and charging control PCC rule corresponding to the service package. The communication unit 1601 is configured to send, to a second device, an identifier of the service package and the PCC rule corresponding to the service package.

In an optional implementation, the communication unit 1601 is further configured to receive, from a data analysis device, a data analysis result corresponding to a target service package. The processing unit 1602 is further configured to perform traffic stimulation or traffic suppression on the target service package based on the data analysis result corresponding to the target service package.

In an optional implementation, the communication apparatus is a policy control function PCF entity, and the second device is a session management function SMF entity. Alternatively, the communication apparatus is a policy and charging rules function PCRF entity, and the second device is a packet data network gateway control plane PGW-C entity. Alternatively, the communication apparatus is a PCRF entity, and the second device is a traffic detection function control plane TDF-C entity. Alternatively, the communication apparatus is a PCRF entity, and the second device is a packet data network gateway PGW. Alternatively, the communication apparatus is a PCRF entity, and the second device is a traffic detection function TDF entity.

In an optional implementation, the communication apparatus is the PCF entity, and the second device is the SMF entity.

The identifier of the service package is carried in an information element of the corresponding PCC rule and sent to the second device. Alternatively, the communication apparatus only sends an identifier of one service package, and the identifier of the service package is carried in an information element of a session rule and sent to the second device.

In an optional implementation, the communication apparatus is the PCRF entity, and the second device is the PGW-C entity. Alternatively, the communication apparatus is the PCRF entity, and the second device is the TDF-C entity. Alternatively, the communication apparatus is the PCRF entity, and the second device is the PGW. Alternatively, the communication apparatus is the PCRF entity, and the second device is the TDF entity.

The identifier of the service package is carried in an information element of a charging-rule-install charging-rule-install message and sent to the second device. Alternatively, the communication apparatus only sends an identifier of one service package, and the identifier of the service package is carried in an information element of a credit control answer CCA message or an information element of a re-authentication request RAR message and sent to the second device.

FIG. 16 is a schematic diagram of a structure of a communication apparatus according to an embodiment of this application. The communication apparatus shown in FIG. 16 may be configured to perform some or all functions of the second device in the method embodiments described in FIG. 6, and FIG. 7A and FIG. 7B. Alternatively, the communication apparatus shown in FIG. 16 may be configured to perform some or all functions of the SMF entity in the method embodiment described in FIG. 8A and FIG. 8B. Alternatively, the communication apparatus shown in FIG. 16 may be configured to perform some or all functions of the PGW-C entity in the method embodiment described in FIG. 9A and FIG. 9B. Alternatively, the communication apparatus shown in FIG. 16 may be configured to perform some or all functions of the TDF-C entity in the method embodiment described in FIG. 10A and FIG. 10B. The communication apparatus shown in FIG. 16 may include a communication unit 1601 and a processing unit 1602.

The communication unit 1601 is configured to receive, from a first device, an identifier of a service package and a policy and charging control PCC rule corresponding to the service package. The processing unit 1602 is configured to convert the PCC rule corresponding to the service package into a packet detection rule PDR. The communication unit 1601 is further configured to send, to a third device, the identifier of the service package and the PDR corresponding to the service package.

In an optional implementation, the communication unit 1601 is further configured to receive, from a data analysis device, a data analysis result corresponding to a target service package. The processing unit 1602 is further configured to perform traffic stimulation or traffic suppression on the target service package based on the data analysis result corresponding to the target service package.

In an optional implementation, the first device is a policy control function PCF entity, the communication apparatus is a session management function SMF entity, and the third device is a user plane function UPF entity. Alternatively, the first device is a policy and charging rules function PCRF entity, the communication apparatus is a packet data network gateway control plane PGW-C entity, and the third device is a packet data network gateway user plane PGW-U entity. Alternatively, the first device is a PCRF entity, the communication apparatus is a traffic detection function control plane TDF-C entity, and the third device is a traffic detection function user plane TDF-U entity.

In an optional implementation, the first device is the PCF entity, the communication apparatus is the SMF entity, and the third device is the UPF entity.

The identifier of the service package is carried in an information element of the corresponding PCC rule and sent to the communication apparatus. Alternatively, the first device only sends an identifier of one service package, and the identifier of the service package is carried in an information element of a session rule and sent to the communication apparatus.

In an optional implementation, the first device is the PCRF entity, the communication apparatus is the PGW-C entity, and the third device is the PGW-U entity. Alternatively, the first device is the PCRF entity, the communication apparatus is the TDF-C entity, and the third device is the TDF-U entity.

The identifier of the service package is carried in an information element of a charging-rule-install charging-rule-install message and sent to the communication apparatus. Alternatively, when the first device only sends an identifier of one service package, the identifier of the service package is carried in an information element of a credit control answer CCA message or an information element of a re-authentication request RAR message and sent to the communication apparatus.

In an optional implementation, the identifier of the service package is carried in an information element of the PDR corresponding to the service package and sent to the third device. Alternatively, when the communication apparatus only sends the identifier of one service package, the identifier of the service package is carried in an information element of a session establishment request and sent to the third device.

FIG. 16 is a schematic diagram of a structure of a communication apparatus according to an embodiment of this application. The communication apparatus shown in FIG. 16 may be configured to perform some or all functions of the third device in the method embodiments described in FIG. 6, and FIG. 7A and FIG. 7B. Alternatively, the communication apparatus shown in FIG. 16 may be configured to perform some or all functions of the UPF entity in the method embodiment described in FIG. 8A and FIG. 8B. Alternatively, the communication apparatus shown in FIG. 16 may be configured to perform some or all functions of the PGW-U entity in the method embodiment described in FIG. 9A and FIG. 9B. Alternatively, the communication apparatus shown in FIG. 16 may be configured to perform some or all functions of the TDF-U entity in the method embodiment described in FIG. 10A and FIG. 10B. The communication apparatus shown in FIG. 16 may include a communication unit 1601 and a processing unit 1602.

The communication unit 1601 is configured to receive, from a second device, an identifier of a service package and a packet detection rule PDR corresponding to the service package. The processing unit 1602 is configured to record a correspondence between the service package and the PDR. The communication unit 1601 is further configured to receive a data packet. The processing unit 1602 is further configured to determine a target packet detection rule PDR matching the data packet. The processing unit 1602 is further configured to obtain, according to the recorded correspondence between the service package and the PDR, a target service package corresponding to the target PDR.

In an optional implementation, the processing unit 1602 is further configured to perform data statistics collection on the target service package based on the data packet, to obtain a data statistics collection result corresponding to the target service package.

In an optional implementation, the communication unit 1601 is further configured to send, to a data analysis device, the data statistics collection result corresponding to the target service package.

In an optional implementation, the communication unit 1601 is further configured to receive, from the data analysis device, a data analysis result corresponding to the target service package.

The processing unit 1602 is further configured to perform traffic stimulation or traffic suppression on the target service package based on the data analysis result corresponding to the target service package.

In an optional implementation, the second device is a session management function SMF entity, and the communication apparatus is a user plane function UPF entity. Alternatively, the second device is a packet data network gateway control plane PGW-C entity, and the communication apparatus is a packet data network gateway user plane PGW-U entity. Alternatively, the second device is a traffic detection function control plane TDF-C entity, and the communication apparatus is a traffic detection function user plane TDF-U entity.

In an optional implementation, the identifier of the service package is carried in an information element of the PDR corresponding to the service package and sent to the communication apparatus. Alternatively, when the second device only sends an identifier of one service package, the identifier of the service package is carried in an information element of a session establishment request and sent to the communication apparatus.

FIG. 16 is a schematic diagram of a structure of a communication apparatus according to an embodiment of this application. The communication apparatus shown in FIG. 16 may be configured to perform some or all functions of the second device in the method embodiments described in FIG. 11, and FIG. 12A and FIG. 12B. Alternatively, the communication apparatus shown in FIG. 16 may be configured to perform some or all functions of the PGW entity in the method embodiment described in FIG. 13A and FIG. 13B. Alternatively, the communication apparatus shown in FIG. 16 may be configured to perform some or all functions of the TDF entity in the method embodiments described in FIG. 14A and FIG. 14B, and FIG. 15A and FIG. 15B. The communication apparatus shown in FIG. 16 may include a communication unit 1601 and a processing unit 1602.

The communication unit 1601 is configured to receive, from a first device, an identifier of a service package and a PCC rule corresponding to the service package. The processing unit 1602 is configured to record a correspondence between the service package and the PCC rule. The communication unit 1601 is further configured to receive a data packet. The processing unit 1602 is further configured to determine a target PCC rule matching the data packet. The processing unit 1602 is further configured to obtain, according to the recorded correspondence between the PCC rule and the service package, a target service package corresponding to the target PCC rule.

In an optional implementation, the processing unit 1602 is further configured to perform data statistics collection on the target service package based on the data packet, to obtain a data statistics collection result.

In an optional implementation, the communication unit 1601 is further configured to send, to a data analysis device, the data statistics collection result corresponding to the target service package.

In an optional implementation, the communication unit 1601 is further configured to receive, from the data analysis device, a data analysis result of the target service package. The processing unit 1602 is further configured to perform traffic stimulation or traffic suppression on the target service package based on the data analysis result corresponding to the target service package.

In an optional implementation, the first device is a policy and charging rules function PCRF entity, and the communication apparatus is a packet data network gateway PGW. Alternatively, the first device is a PCRF, and the communication apparatus is a service detection function TDF entity. Alternatively, the first device is a PGW, and the communication apparatus is a TDF entity.

In an optional implementation, the first device is the PCRF entity, and the communication apparatus is the PGW. Alternatively, the first device is the PCRF, and the communication apparatus is the TDF entity.

The identifier of the service package is carried in an information element of a charging-rule-install charging-rule-install message and sent to the communication apparatus. Alternatively, the first device only sends an identifier of one service package, and the identifier of the service package is carried in an information element of a credit control answer CCA message or an information element of a re-authentication request RAR message and sent to the communication apparatus.

FIG. 16 is a schematic diagram of a structure of a communication apparatus according to an embodiment of this application. The communication apparatus shown in FIG. 16 may be configured to perform some or all functions of the data analysis device in the method embodiments described in FIG. 6 to FIG. 15A and FIG. 15B. The communication apparatus shown in FIG. 16 may include a communication unit 1601 and a processing unit 1602.

The communication unit 1601 is configured to receive a data statistics collection result corresponding to a target service package. The processing unit 1602 is configured to analyze the data statistics collection result to obtain a data analysis result corresponding to the target service package. The communication unit 1601 is further configured to send the data analysis result corresponding to the target service package.

Figure 17:
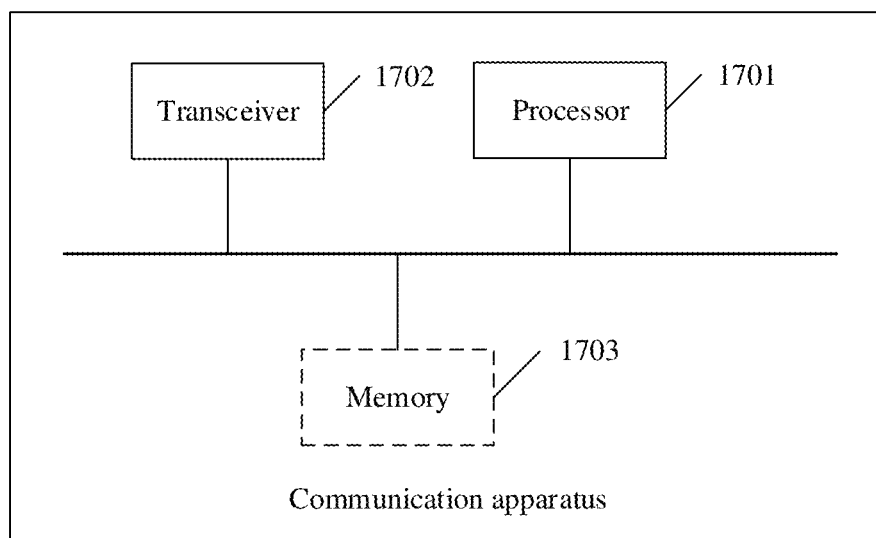
FIG. 17 is a schematic diagram of a structure of another communication apparatus according to an embodiment of this application.

FIG. 17 is a schematic diagram of a structure of a communication apparatus disclosed in an embodiment of this application. The communication apparatus may be configured to implement the communication methods described in the foregoing method embodiments. The communication apparatus may be the first device or an apparatus used for the first device. For example, the apparatus used for the first device may be a chip in the first device. Alternatively, the communication apparatus may be the second device or an apparatus used for the second device. For example, the apparatus used for the second device may be a chip in the second device. Alternatively, the communication apparatus may be the third device or an apparatus used for the third device. For example, the apparatus used for the third device may be a chip in the third device.

As shown in FIG. 17, the communication apparatus includes a processor 1701 and a transceiver 1702. The processor 1701 is connected to the transceiver 1702. Optionally, the communication apparatus may further include a memory 1703. The memory 1703 is connected to the processor 1701.

The processor 1701 may support the communication apparatus to implement the communication methods in the embodiments of this application.

For example, when the communication apparatus is the first device or the apparatus used for the first device, the processor 1701 may perform the method performed by the first device in the method embodiment described in FIG. 4 or FIG. 6. For an operation performed by the processor 1701, refer to related description about the first device in the embodiment corresponding to FIG. 4 or FIG. 6. Details are not described herein. The first device may be the PCRF entity or the PCF entity. When the first device is the PCRF entity, for an operation performed by the processor 1701, further refer to related description about the PCRF entity in the embodiment corresponding to FIG. 8A and FIG. 8B. Details are not described herein. When the first device is the PCF entity, for an operation performed by the processor 1701, further refer to related description about the PCF entity in the embodiments corresponding to FIG. 9A and FIG. 9B, and FIG. 10A and FIG. 10B. Details are not described herein.

When the communication apparatus is the second device or the apparatus used for the second device, the processor 1701 may perform the method performed by the second device in the method embodiment described in FIG. 6, FIG. 7A and FIG. 7B, FIG. 11, or FIG. 12A and FIG. 12B. For an operation performed by the processor 1701, refer to related description about the second device in the embodiment corresponding to FIG. 6, FIG. 7A and FIG. 7B, FIG. 11, or FIG. 12A and FIG. 12B. Details are not described herein. The second device may be the SMF entity, the PGW-C entity, the TDF-C entity, the PGW, or the TDF entity. When the second device is the SMF entity, for an operation performed by the processor 1701, further refer to related description about the SMF entity in the embodiment corresponding to FIG. 8A and FIG. 8B. Details are not described herein. When the second device is the PGW-C entity, for an operation performed by the processor 1701, further refer to related description about the PGW-C entity in the embodiment corresponding to FIG. 9A and FIG. 9B. Details are not described herein. When the second device is the TDF-C entity, for an operation performed by the processor 1701, further refer to related description about the TDF-C entity in the embodiment corresponding to FIG. 10A and FIG. 10B. Details are not described herein. When the second device is the PGW, for an operation performed by the processor 1701, further refer to related description about the PGW in the embodiment corresponding to FIG. 13A and FIG. 13B. Details are not described herein. When the second device is the TDF entity, for an operation performed by the processor 1701, further refer to related description about the TDF in the embodiment corresponding to FIG. 14A and FIG. 14B, or FIG. 15A and FIG. 15B. Details are not described herein.

When the communication apparatus is the third device or the apparatus used for the third device, the processor 1701 may perform the method performed by the third device in the method embodiment described in FIG. 6, or FIG. 7A and FIG. 7B. For an operation performed by the processor 1701, refer to related description about the third device in the embodiment corresponding to FIG. 6, or FIG. 7A and FIG. 7B. Details are not described herein. The third device may be the UPF entity, the PGW-U entity, or the TDF-U entity. When the third device is the UPF entity, for an operation performed by the processor 1701, further refer to related description about the UPF entity in the embodiment corresponding to FIG. 8A and FIG. 8B. Details are not described herein. When the third device is the PGW-U entity, for an operation performed by the processor 1701, further refer to related description about the PGW-U entity in the embodiment corresponding to FIG. 9A and FIG. 9B. Details are not described herein. When the third device is the TDF-U entity, for an operation performed by the processor 1701, further refer to related description about the TDF-U entity in the embodiment corresponding to FIG. 10A and FIG. 10B. Details are not described herein.

The processor 1701 may be a central processing unit (CPU), a general-purpose processor, a coprocessor, a digital signal processor (DSP), an application-specific integrated circuit (ASIC), a field programmable gate array (FPGA) or another programmable logic device, a transistor logic device, a hardware component, or any combination thereof. The processor 1701 may alternatively be a combination implementing a computing function, for example, a combination of one or more microprocessors or a combination of a DSP and a microprocessor.

When the communication apparatus is the first device, the second device, or the third device, the transceiver 1702 may include an antenna and a radio frequency circuit connected to the antenna. The transceiver 1702 is configured to communicate with another network element.

When the communication apparatus is the apparatus used for the first device, the apparatus used for the second device, or the apparatus used for the third device, the transceiver 1702 may be an interface circuit. The interface circuit is used by the processor to obtain or output information or data. For example, the interface circuit is used by the processor to read data from the memory or write data into the memory. For another example, the interface circuit is used by the processor 1701 to receive information or data from outside the device, or send information or data to outside the device.

Optionally, the communication apparatus may include the memory 1703. The memory 1703 stores a program (which may also be instructions or code), and the program may be run by the processor 1701, so that the processor 1701 performs the communication methods described in the foregoing method embodiments. Optionally, the memory 1703 may further store data. Optionally, the processor 1701 may further read data (for example, predefined information) stored in the memory 1703. The data and the program may be stored at a same storage address, or the data and the program may be stored at different storage addresses.

The processor 1701 and the memory 1703 may be disposed separately, or may be integrated together, for example, integrated on a board or integrated into a system on chip (SoC).

An embodiment of this application further provides a computer-readable storage medium. The computer-readable storage medium stores instructions. When the instructions are run on a processor, the method procedures in the foregoing method embodiments are implemented.

An embodiment of this application further provides a computer program product. When the computer program product runs on a processor, the method procedures in the foregoing method embodiments are implemented.

When the devices provided in this application are implemented by using software, all or some of the devices may be implemented in a form of a computer program product. The computer program product includes one or more computer instructions. When the computer program instructions are loaded and executed on a computer, all or some of the procedures or functions according to the embodiments of this application are implemented. The computer may be a general-purpose computer, a special-purpose computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Description of the embodiments provided in this application may refer to each other, and description of the embodiments has different focuses. For a part not described in detail in an embodiment, refer to related description in another embodiment. For ease of description and brevity, for functions and performed steps of the apparatuses and devices provided in the embodiments of this application, refer to related description in the method embodiments of this application. Mutual reference, combination, or reference may be made between the method embodiments and between the apparatus embodiments.

Finally, it should be noted that the foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

The invention claimed is:

1. A communication method, wherein the method comprises:
   receiving, by a network device comprising a processor, a data packet;
   obtaining, by the network device according to a correspondence between a service package and a packet detection rule (PDR), a target service package corresponding to a target PDR matching the data packet;
   performing, by the network device, data statistics collection based on the target service package, to obtain a data statistics collection result corresponding to the target service package;
   sending, by the network device to a data analysis device, the data statistics collection result corresponding to the target service package;
   receiving, by the network device from the data analysis device, a data analysis result corresponding to the target service package;
   determining, by the network device according to the data analysis result, total traffic usage on applications in the target service package is greater than a first threshold;
   determining, by the network device according to the data analysis result, total traffic usage on the target service package is greater than a second threshold; and
   performing, by the network device in response to determining the total traffic usage on the applications in the target service package is greater than the first threshold and determining the total traffic usage on the target service package is greater than the second threshold, traffic stimulation or traffic suppression on the target service package based on the data analysis result corresponding to the target service package.

2. The method according to claim 1, wherein the method further comprises:
   receiving, by the network device, an identifier of the service package and the PDR corresponding to the service package.

3. The method according to claim 2, wherein the network device receives the identifier of the service package and the PDR corresponding to the service package from a session management function entity, a packet data network gateway control plane entity, or a traffic detection function control plane entity.

4. The method according to claim 2, wherein the identifier of the service package is carried in an information element of the PDR corresponding to the service package.

5. The method according to claim 2, wherein the identifier is of one service package, and the identifier of the one service package is carried in an information element of a session establishment request.

6. The method according to claim 1, wherein the method further comprises:
   recording, by the network device, the correspondence between the service package and the PDR.

7. The method according to claim 1, wherein the method further comprises:
   ranking total traffic usage on the target service package in front of a preset location,
   wherein the data analysis result corresponding to the target service package includes a ranking result, and the traffic stimulation or traffic suppression on the target service package based on the data analysis result corresponding to the target service package is based on the ranking result.

8. The method according to claim 1, wherein the network device is a user plane function entity, a packet data network gateway user plane entity, or a traffic detection function user plane entity.

9. The method according to claim 1, further comprising:
   receiving, by the data analysis device, the data statistics collection result corresponding to the target service package.

10. The method according to claim 1, wherein the method further comprises:
    determining a quantity of devices sharing a hotspot in the target service package;
    determining the quantity of devices sharing the hotspot is greater than a third threshold; and
    the traffic stimulation or traffic suppression on the target service package based on the data analysis result corresponding to the target service package suppresses the traffic based on determining the quantity of devices sharing the hotspot is greater than the third threshold.

11. The method according to claim 1, wherein the method further comprises:
    sorting the applications in the target service package based on total traffic usage on the applications in the target service package,
    wherein the data analysis result corresponding to the target service package includes results of the sorting, and the traffic stimulation or traffic suppression on the target service package based on the data analysis result corresponding to the target service package is based on the results of the sorting.

12. A network device, comprising:
a memory storing executable instructions;
a processor configured to execute the executable instructions to perform operations of:
receive a data packet;
obtain, according to a correspondence between a service package and a packet detection rule (PDR), a target service package corresponding to a target PDR matching the data packet;
perform data statistics collection based on the target service package, to obtain a data statistics collection result corresponding to the target service package;
send, to a data analysis device, the data statistics collection result corresponding to the target service package;
receive, from the data analysis device, a data analysis result corresponding to the target service package;
determine, according to the data analysis result, total traffic usage on applications in the target service package is greater than a first threshold;
determine, according to the data analysis result, total traffic usage on the target service package is greater than a second threshold; and
perform, in response to determining the total traffic usage on the applications in the target service package is greater than the first threshold and determining the total traffic usage on the target service package is greater than the second threshold, traffic stimulation or traffic suppression on the target service package based on the data analysis result corresponding to the target service package.

13. The network device according to claim 12, wherein the processor is configured to execute the executable instructions to further perform operations of:
receive an identifier of the service package and the PDR corresponding to the service package.

14. The network device according to claim 12, wherein the processor is configured to execute the executable instructions to further perform operations of:
rank total traffic usage on the target service package in front of a preset location,
wherein the data analysis result corresponding to the target service package includes a ranking result of the total traffic usage on the target service package, and the traffic stimulation or traffic suppression on the target service package based on the data analysis result corresponding to the target service package is based on the ranking result.

15. A communication system, comprising:
a network device comprising a processor; and
a data analysis device,
wherein the network device is configured to:
receive a data packet;
obtain, according to a correspondence between a service package and a packet detection rule (PDR), a target service package corresponding to a target PDR matching the data packet;
perform data statistics collection based on the target service package, to obtain a data statistics collection result corresponding to the target service package;
send, to a data analysis device, the data statistics collection result corresponding to the target service package;
receive, from the data analysis device, a data analysis result corresponding to the target service package;
determine, according to the data analysis result, total traffic usage on applications in the target service package is greater than a first threshold;
determine, according to the data analysis result, total traffic usage on the target service package is greater than a second threshold; and
perform, in response to determining the total traffic usage on the applications in the target service package is greater than the first threshold and determining the total traffic usage on the target service package is greater than the second threshold, traffic stimulation or traffic suppression on the target service package based on the data analysis result corresponding to the target service package; and
wherein the data analysis device is configured to:
receive, from the network device, the data statistics collection result corresponding to the target service package, and send the data statistics collection result to the network device.

16. The communication system according to claim 15, further comprising:
a network entity configured to:
receive an identifier of the service package and a PCC rule corresponding to the service package;
convert the PCC rule corresponding to the service package into a packet detection rule (PDR); and
send, to the network device, the identifier of the service package and the PDR corresponding to the service package.

17. The communication system according to claim 15, wherein the network device is further configured to:
rank total traffic usage on the target service package in front of a preset location,
wherein the data analysis result corresponding to the target service package includes a ranking result of the total traffic usage on the target service package, and the traffic stimulation or traffic suppression on the target service package based on the data analysis result corresponding to the target service package is based on the ranking result.

* * * * *